(12) United States Patent
Hidaka et al.

(10) Patent No.: US 12,300,439 B2
(45) Date of Patent: May 13, 2025

(54) MULTI-TERMINAL MULTILAYER CAPACITOR

(71) Applicant: Murata Manufacturing Co., Ltd., Nagaokakyo (JP)

(72) Inventors: Seiji Hidaka, Nagaokakyo (JP); Yukihiro Fujita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 200 days.

(21) Appl. No.: 18/101,132

(22) Filed: Jan. 25, 2023

(65) Prior Publication Data

US 2023/0162919 A1     May 25, 2023

Related U.S. Application Data

(63) Continuation of application No. PCT/JP2021/027872, filed on Jul. 28, 2021.

(30) Foreign Application Priority Data

Aug. 12, 2020    (JP) ................... 2020-136462

(51) Int. Cl.
    *H01G 4/232*     (2006.01)
    *H01G 4/30*     (2006.01)

(52) U.S. Cl.
    CPC ............ *H01G 4/232* (2013.01); *H01G 4/30* (2013.01)

(58) Field of Classification Search
    CPC ................................ H01G 4/232; H01G 4/30
    See application file for complete search history.

(56) References Cited

U.S. PATENT DOCUMENTS

| 6,344,961 B1 | 2/2002 | Naito et al. |
| 7,035,079 B1* | 4/2006 | Park ............... H01G 4/232 |
| | | 361/303 |
| 2002/0088977 A1 | 7/2002 | Mori et al. |
| 2006/0092595 A1* | 5/2006 | Hwa Lee ........ H01G 2/065 |
| | | 361/306.3 |

(Continued)

FOREIGN PATENT DOCUMENTS

| JP | 2001148325 A | 5/2001 |
| JP | 2002160467 A | 6/2002 |

(Continued)

OTHER PUBLICATIONS

International Search Report in PCT/JP2021/027872, mailed Oct. 5, 2021, 3 pages.

(Continued)

*Primary Examiner* — Michael P McFadden
(74) *Attorney, Agent, or Firm* — Keating & Bennett, LLP

(57) ABSTRACT

A multi-terminal multilayer capacitor includes first vias and second vias extending in first and second internal electrodes in a stacking direction, a first slit extending between the first via and a first insulating portion that insulates the second via and the first internal electrode from each other, and a second slit extending between the second via and a second insulating portion that insulates the first via and the second internal electrode from each other. The first via electrically connects regions of the first internal electrode split by the first slit, and the second via electrically connects regions of the second internal electrode divided by the second slit.

15 Claims, 24 Drawing Sheets

(56) References Cited

U.S. PATENT DOCUMENTS

| | | | |
|---|---|---|---|
| 2016/0126564 A1* | 5/2016 | Nakai | B32B 18/00 |
| | | | 429/468 |
| 2018/0122575 A1* | 5/2018 | Jang | H01G 4/232 |
| 2020/0135400 A1* | 4/2020 | Sakurai | H01G 4/232 |

FOREIGN PATENT DOCUMENTS

| | | | |
|---|---|---|---|
| JP | 2002260959 A | | 9/2002 |
| JP | 2003059755 A | * | 2/2003 |
| JP | 2006135333 A | | 5/2006 |

OTHER PUBLICATIONS

Written Opinion in PCT/JP2021/027872, mailed Oct. 5, 2021, 4 pages.

* cited by examiner

MULTI-TERMINAL MULTILAYER CAPACITOR

CROSS REFERENCE TO RELATED APPLICATIONS

This application claims the benefit of priority to Japanese Patent Application No. 2020-136462 filed on Aug. 12, 2020 and is a Continuation Application of PCT Application No. PCT/JP2021/027872 filed on Jul. 28, 2021. The entire contents of each application are hereby incorporated herein by reference.

BACKGROUND OF THE INVENTION

1. Field of the Invention

The present invention relates to a multi-terminal multilayer capacitor.

2. Description of the Related Art

Various techniques have been proposed in order to reduce ESL (equivalent series inductance) of a capacitor. For example, Japanese Unexamined Patent Application Publication No. 2006-135333 discloses a multilayer capacitor array configured to include a capacitor body, first and second internal electrodes alternately arranged to face each other with a multilayer dielectric layer interposed therebetween, first and second external terminals formed on at least one of upper and lower surfaces of the body, and first and second conductive via holes formed in a stacking direction of the body and connected to the first and second external terminals, respectively. In particular, in the multilayer capacitor array, in order to reduce ESL, the first conductive via holes and the second conductive via holes are arranged (alternately arranged) such that magnetic fields induced by currents flowing through the internal electrodes connected to the first conductive via holes and the second conductive via holes cancel each other.

In addition, Japanese Unexamined Patent Application Publication No. 2002-160467 discloses a multilayer capacitor in which an internal electrode and an external terminal electrode are connected to each other through a via hole conductor, and an island-like cutout portion through which the via hole conductor passes is formed in the internal electrode electrically insulated from the via hole conductor in order to reduce the ESL. In this multilayer capacitor, a plurality of the island-like cutout portions is connected to each other, and cutout connection portions are formed so as to connect the respective outer side portions of the internal electrodes to the island-like cutout portions. That is, the cutout connection portion is formed so as to divide (split) the internal electrode into a plurality of regions insulated from each other.

SUMMARY OF THE INVENTION

However, in the multilayer capacitor array described in Japanese Unexamined Patent Application Publication No. 2006-135333, since the plurality of vias is conductively connected to the internal electrodes, there is a problem that a decrease in capacitance (effective value) due to the skin effect may occur in a high-frequency region, for example.

In the multilayer capacitor described in Japanese Unexamined Patent Application Publication No. 2002-160467, the internal electrode is divided (split) into a plurality of regions by the cutout connection portion, and thus, for example, characteristics such as capacitance and ESR (equivalent series resistance) may deteriorate, and the mechanical strength of the element may decrease. In particular, when vias are arranged at a narrow pitch, these problems may become significant.

Preferred embodiments of the present invention provide multi-terminal multilayer capacitors each capable of reducing or preventing a decrease in capacitance (effective value) while maintaining a low ESL in a high-frequency region, and capable of securing mechanical strength of an element.

A multi-terminal multilayer capacitor according to a preferred embodiment of the present invention includes first internal electrodes and second internal electrodes alternately stacked with a dielectric layer interposed between the first internal electrode and the second internal electrode, a plurality of first vias located inside the first internal electrode and the second internal electrode in a plan view, electrically connected to the first internal electrode and insulated from the second internal electrode, and penetrating the first internal electrode and the second internal electrode in a stacking direction, a plurality of second vias located inside the first internal electrode and the second internal electrode in a plan view, electrically connected to the second internal electrode and insulated from the first internal electrode, and penetrating the first internal electrode and the second internal electrode in a stacking direction, a first slit extending between a first insulating portion and the first via, the first insulating portion being located around the second via that penetrates the first internal electrode and insulating the second via and the first internal electrode from each other, a second slit extending between a second insulating portion and the second via, the second insulating portion being located around the first via that penetrates the second internal electrode and insulating the first via and the second internal electrode from each other, a plurality of first external terminals connected to the plurality of first vias, respectively, and a plurality of second external terminals connected to the plurality of second vias, respectively, wherein the first internal electrode is split into a plurality of first regions by the first slit and the first via electrically connects the plurality of first regions, and the second internal electrode is split into a plurality of second regions by the second slit and the second via electrically connects the plurality of second regions.

According to a multilayer capacitor according to a preferred embodiment of the present invention, when the first internal electrode is split into a plurality of regions by the first slit, the first via is positioned to electrically connect the plurality of regions, and when the second internal electrode is split into a plurality of regions by the second slit, the second via is positioned to electrically connect the plurality of regions. Therefore, the first and second internal electrodes are prevented from being divided (split) into a plurality of regions insulated from each other. When a voltage is applied to the first and second external terminals, a common voltage is applied to the first and second internal electrodes through the conductive connection with the first and second vias. Therefore, the capacitance can be increased as compared with the case where the internal electrode is electrically divided (split). Further, since the multi-terminal multilayer capacitor includes two conductors as a whole, the occurrence of an unnecessary resonance mode at a high frequency can be reduced or prevented.

In addition, the first slit extends between the first via and the first insulating portion that is located around the second via penetrating the first internal electrode and insulates the second via and the first internal electrode from each other, and the second slit extends between the second via and the second insulating portion that is located around the first via penetrating the second internal electrode and insulates the first via and the second internal electrode from each other. Therefore, when the first and second vias are viewed in a cross section including the center thereof and the first and second slits, the path of the conductor surface along the axial direction of the first and second vias is shortened. Thus, the impedance along the axial direction of the first and second vias is reduced. As a result, the voltage drop seen in the axial direction of the first and second vias is reduced, and the decrease in the capacitance in the high-frequency region is mitigated (that is, the frequency characteristic of the capacitance is flattened). In addition, an effect of reducing ESR and ESL can be obtained.

Further, the plurality of first vias is located inside the first internal electrode and the second internal electrode in a plan view, and the plurality of second vias is located inside the first internal electrode and the second internal electrode in a plan view. That is, the first and second vias are not located at the outer edge portions of the first and second internal electrodes. Therefore, the outer edges (outer peripheries) of the first and second internal electrodes are not divided by the first and second slits. Thus, the mechanical strength of the element can be ensured.

As a result, according to a preferred embodiment of the present invention, a decrease in capacitance (effective value) can be reduced or prevented while maintaining a low ESL in a high-frequency region, and the mechanical strength of the element can be secured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
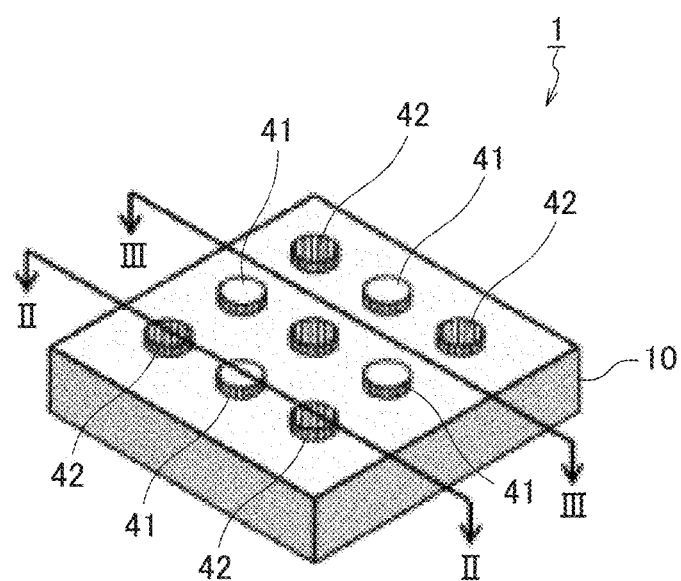
FIG. 1 is a perspective view illustrating a configuration of a multi-terminal multilayer capacitor according to a first preferred embodiment of the present invention.

Hereinafter, preferred embodiments of the present invention will be described in detail with reference to the drawings. Note that in the drawings, the same or corresponding portions are denoted by the same reference numerals. Additionally, in each of the drawings, the same elements are denoted by the same reference numerals, and overlapping descriptions thereof will be omitted.

First Preferred Embodiment

Figure 2:
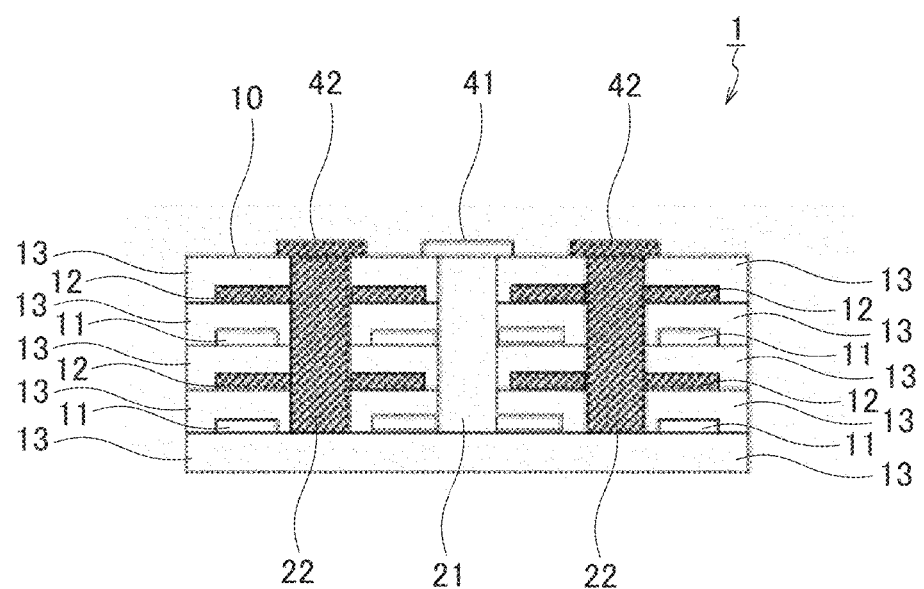
FIG. 2 is a cross-sectional view taken along line II-II of FIG. 1.
Figure 3:
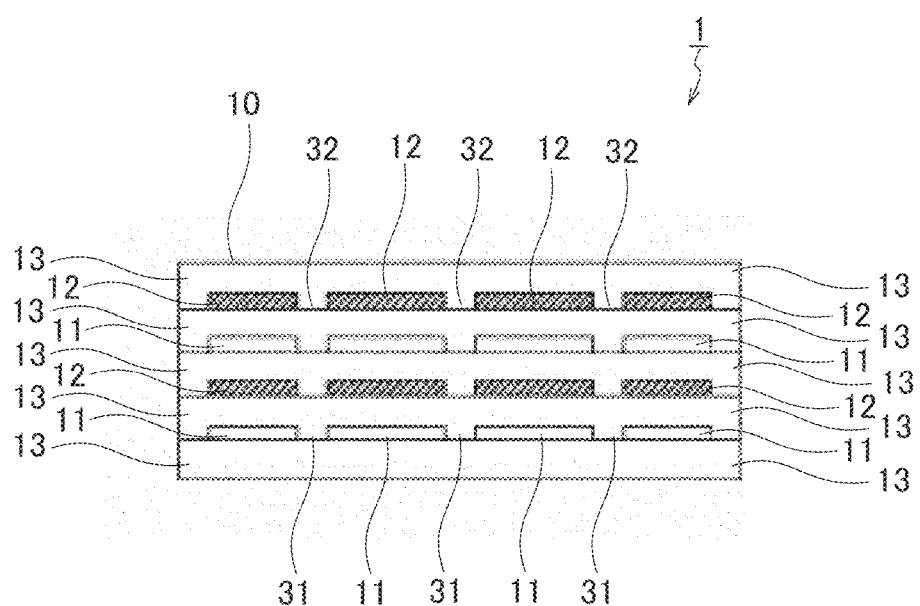
FIG. 3 is a cross-sectional view taken along line III-III of FIG. 1.
Figure 4:
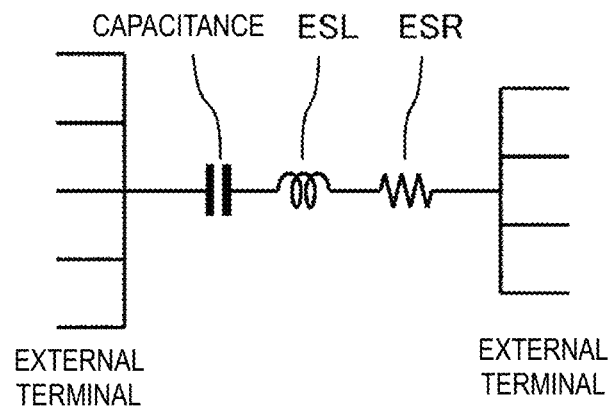
FIG. 4 is a diagram illustrating an equivalent circuit of the multi-terminal multilayer capacitor according to the first preferred embodiment of the present invention.
Figure 5:
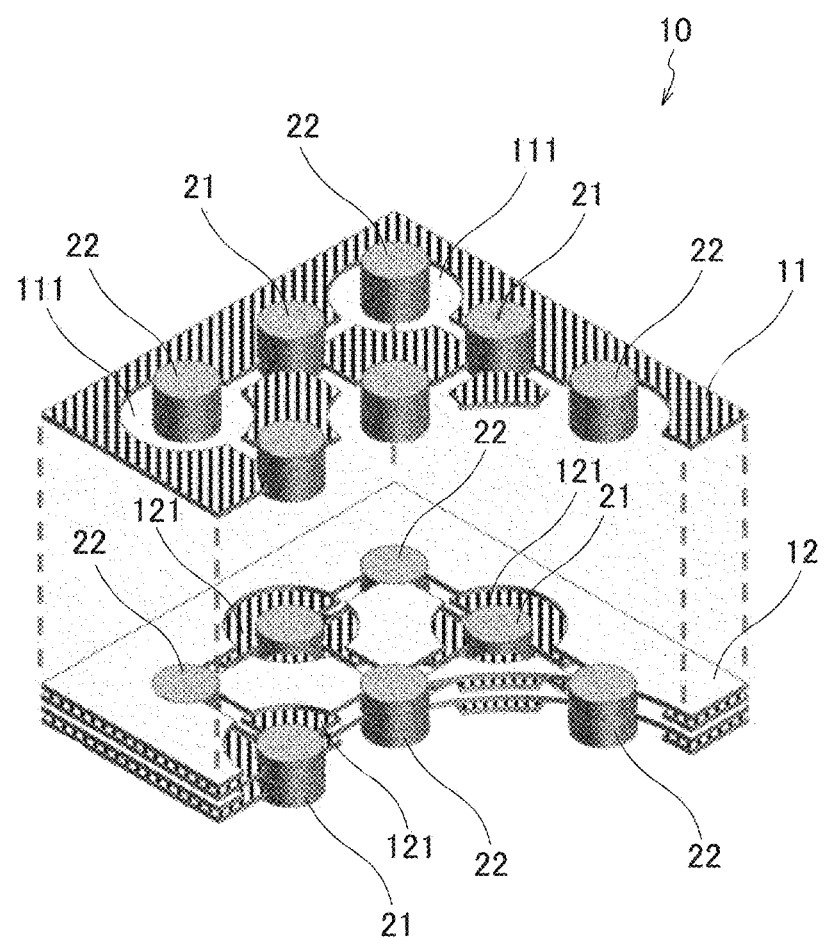
FIG. 5 is an exploded perspective view illustrating the internal structure of the multi-terminal multilayer capacitor according to the first preferred embodiment of the present invention.
Figure 6A:
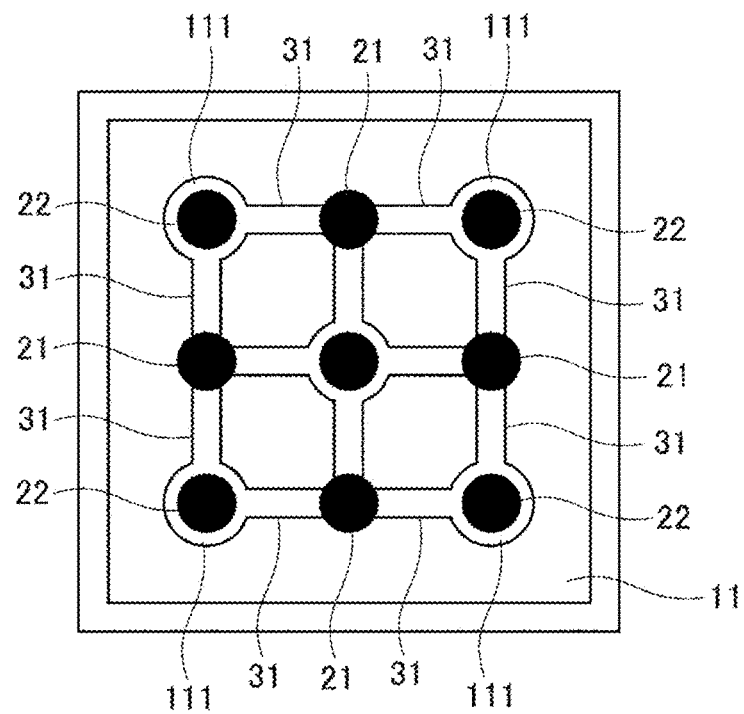
FIGS. 6A and 6B include plan views illustrating the configuration of a first internal electrode and a second internal electrode of the multi-terminal multilayer capacitor according to the first preferred embodiment of the present invention.
Figure 6B:
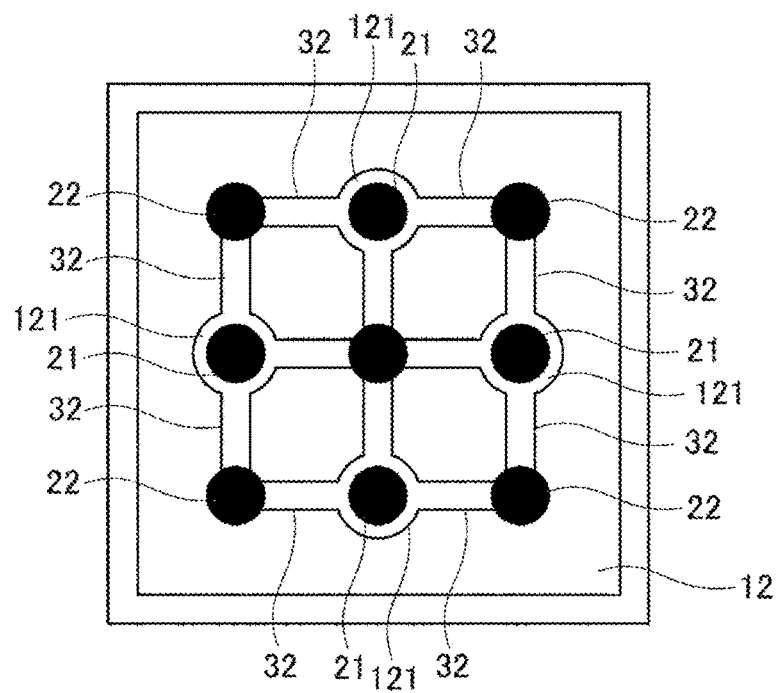

First, a configuration of a multi-terminal multilayer capacitor 1 according to a first preferred embodiment will be described with reference to FIG. 1 to FIG. 6B. FIG. 1 is a perspective view illustrating the configuration of the multi-terminal multilayer capacitor 1. FIG. 2 is a cross-sectional view taken along line II-II of FIG. 1. FIG. 3 is a cross-sectional view taken along line III-III of FIG. 1. FIG. 4 is a diagram illustrating an equivalent circuit of the multi-terminal multilayer capacitor 1. Here, although minute L (inductance) and R (resistance) are parasitic on first and second external terminals 41 and 42, in the equivalent circuit illustrated in FIG. 4, these parasitic L and R are collected into ESL and ESR and are not directly illustrated. FIG. 5 is an exploded perspective view illustrating the internal structure of the multi-terminal multilayer capacitor 1. FIGS. 6A and 6B include plan views illustrating the configuration of a first internal electrode 11 and a second internal electrode 12 of the multi-terminal multilayer capacitor 1.

The multi-terminal multilayer capacitor 1 includes, for example, a multilayer body 10 has a rectangular or substantially rectangular parallelepiped shape, and nine external terminals 41 and 42, more specifically, four first external terminals 41 and five second external terminals 42, located on the top surface (upper surface) of the multilayer body 10.

The multilayer body 10 is configured by the first internal electrodes 11 and second internal electrodes 12 that are alternately stacked facing each other with a plurality of dielectric layers (insulator layers) 13 with a rectangular or substantially rectangular shape interposed therebetween. The dielectric layer 13 is formed of, for example, a dielectric ceramic containing $BaTiO_3$, $CaTiO_3$, $SrTiO_3$, $CaZrO_3$, or the like as a main component. Note that in addition to these main components, accessory components such as a Mn compound, a Fe compound, a Cr compound, a Co compound, and a Ni compound may be added.

The first internal electrode 11 and the second internal electrode 12 preferably have, for example, a rectangular or substantially rectangular thin film shape. Each of the first internal electrode 11 and the second internal electrode 12 is formed of, for example, Ni, Cu, Ag, Pd, an Ag—Pd alloy, Au, or the like.

A plurality of (for example, four in the present preferred embodiment) first vias 21 is located in the multilayer body 10, the first vias 21 being positioned inside the first internal electrode 11 and the second internal electrode 12 in a plan view (i.e., no contact with the outer edges), electrically connected (conducted) to the first internal electrode 11 and insulated from the second internal electrode 12, and penetrating the multilayer body 10 in the stacking direction (thickness direction).

Similarly, a plurality of (for example, five in the present preferred embodiment) second vias 22 is located in the multilayer body 10, the second vias 22 being positioned inside the first internal electrode 11 and the second internal electrode 12 in a plan view (i.e., no contact with the outer edges), electrically connected (conducted) to the second internal electrode 12 and insulated from the first internal electrode 11, and penetrating the multilayer body 10 in the stacking direction (thickness direction).

The plurality of (for example, four) first external terminals 41 is connected to end portions of the plurality of (for example, four) first vias 21, respectively. Similarly, the plurality of (for example, five) second external terminals 42 is connected to end portions of the plurality of (five) second vias 22, respectively. The first external terminal 41 and the second external terminal 42 are formed of, for example, a conductive material including silver as a main component.

The present preferred embodiment has the configuration in which the first external terminals 41 (the first vias 21) and the second external terminals 42 (the second vias 22) are alternately arranged in rows and columns (matrix) in a plan view.

An annular first insulating portion (cavity) 111 is located in the first internal electrode 11, the first insulating portion 111 being located around the second via 22 that penetrates the first internal electrode 11 and insulating the second via 22 and the first internal electrode 11 from each other. In addition, a linear first slit (gap) 31 is extending between the first insulating portion 111 and the first via 21.

Similarly, an annular second insulating portion (cavity) 121 is located in the second internal electrode 12, the second insulating portion 121 being located around the first via 21 that penetrates the second internal electrode 12 and insulating the first via 21 and the second internal electrode 12 from each other. In addition, a linear second slit (gap) 32 is extending between the second insulating portion 121 and the second via 22.

In the present preferred embodiment, the first slits 31 and the second slits 32 are positioned to define a lattice shape (a grid shape) of three rows and three columns. Note that the shape of the first and second slits 31 and 32 is not limited to three rows and three columns, and can be arbitrarily set in accordance with requirements or the like (the same applies hereinafter). Additionally, in the present preferred embodiment, the first slit 31 and the second slit 32 overlap (coincide with) each other in a plan view.

Here, when the first internal electrode 11 is split into a plurality of regions (for example, five regions in the present preferred embodiment) by the first slit 31, the first via 21 is disposed so as to electrically connect (conduct) the plurality of regions. Therefore, the first internal electrode 11 is a single internal electrode having a common potential. Similarly, when the second internal electrode 12 is split into a plurality of regions (for example, five regions in the present preferred embodiment) by the second slit 32, the second via 22 is disposed so as to electrically connect (conduct) the plurality of regions. Therefore, the second internal electrode 12 is a single internal electrode having a common potential.

By being configured as described above, according to the present preferred embodiment, when the first internal electrode 11 is split into a plurality of (five) regions by the first slit 31, the first via 21 is disposed so as to electrically connect (conduct) the plurality of regions, and when the second internal electrode 12 is split into a plurality of (five) regions by the second slit 32, the second via 22 is disposed so as to electrically connect (conduct) the plurality of regions. Therefore, the first and second internal electrodes 11 and 12 are prevented from being divided (split) into a plurality of regions insulated from each other. When a voltage is applied to the first and second external terminals 41 and 42, a common voltage is applied to each of the first and second internal electrodes 11 and 12 through the conductive connection with the first and second vias 21 and 22. Therefore, the capacitance can be increased as compared with the case where the internal electrode is electrically divided (split). In addition, since the multi-terminal multilayer capacitor 1 includes two conductors as a whole, occurrence of an unnecessary resonance mode at a high frequency can be reduced or prevented.

In addition, according to the present preferred embodiment, the first slit 31 is extending between the first via 21 and the first insulating portion 111 that insulates the second via 22 and the first internal electrode 11 from each other, and the second slit 32 is extending between the second via 22 and the second insulating portion 121 that insulates the first via 21 and the second internal electrode 12 from each other. Therefore, when the first and second vias 21 and 22 are viewed in a cross section including the center thereof and the first and second slits 31 and 32, the path of the conductor surface along the axial direction of the first and second vias 21 and 22 is shortened. Thus, the impedance along the axial direction of the first and second vias 21 and 22 is reduced. As a result, the voltage drop seen in the axial direction of the first and second vias 21 and 22 is reduced, and the decrease in the capacitance in the high-frequency region is mitigated (that is, the frequency characteristic of the capacitance is flattened). In addition, an effect of reducing ESR and ESL can be obtained.

Furthermore, according to the present preferred embodiment, the plurality of first vias 21 and the plurality of second vias 22 are positioned inside the first internal electrode 11 and the second internal electrode 12 (i.e., no contact with the outer edge) in a plan view. That is, the first and second vias 21 and 22 are not located at the outer edge portions of the first and second internal electrodes 11 and 12. Therefore, the outer edges (outer peripheries) of the first and second internal electrodes 11 and 12 are not divided by the first and second slits 31 and 32. Therefore, the mechanical strength of the element can be secured, and the flatness of the element can be secured.

As a result, according to the present preferred embodiment, a decrease in capacitance (effective value) can be reduced or prevented while maintaining a low ESL in a high-frequency region, and the mechanical strength of the element can be secured.

Figure 7A:
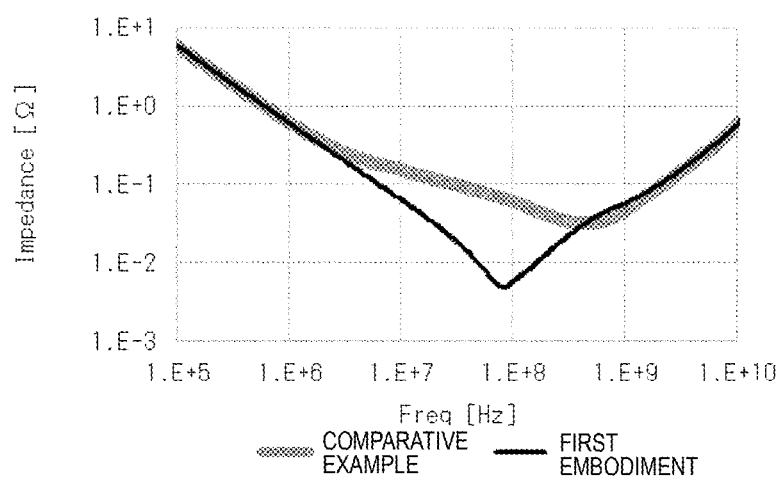
FIGS. 7A and 7B include graphs illustrating impedance characteristics and ESR characteristics of the multi-terminal multilayer capacitor according to the first preferred embodiment of the present invention and a comparative example.
Figure 7B:
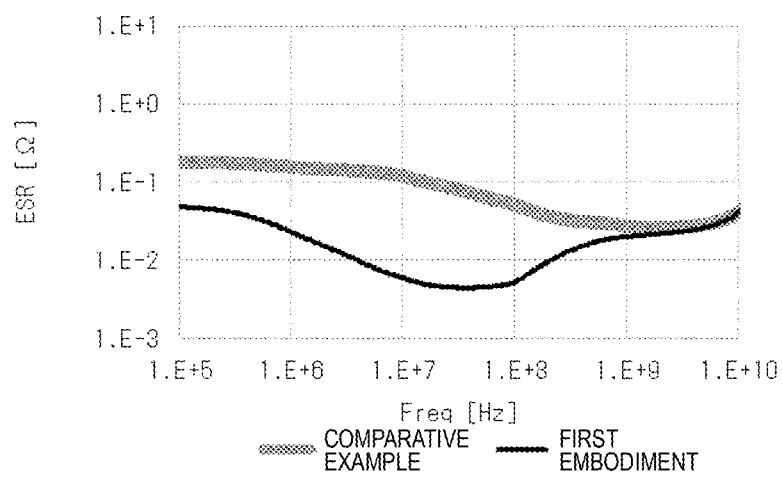

Here, impedance characteristics and ESR characteristics of the multi-terminal multilayer capacitor 1 according to the present preferred embodiment and a comparative example are illustrated in FIGS. 7A and 7B. Note that in the comparative example, the first slit 31 and the second slit 32 were not provided (the same applies to the following description). FIG. 7A illustrates impedance characteristics (simulation results) of the multi-terminal multilayer capacitor 1 and the comparative example, and FIG. 7B illustrates ESR characteristics (simulation results) of the multi-terminal multilayer capacitor 1 and the comparative example. In the graph of FIG. 7A, the horizontal axis represents frequency (Hz) and the vertical axis represents impedance ($\Omega$). Additionally, in the graph of FIG. 7B, the horizontal axis represents frequency (Hz) and the vertical axis represents ESR ($\Omega$).

As illustrated in FIG. 7A, according to the multi-terminal multilayer capacitor 1, it was confirmed that the impedance (particularly, the impedance in the vicinity of 100 MHz) was reduced as compared with the comparative example. In addition, as illustrated in FIG. 7B, according to the multi-terminal multilayer capacitor 1, it was confirmed that the ESR was lowered as compared with the comparative example.

Figure 8A:
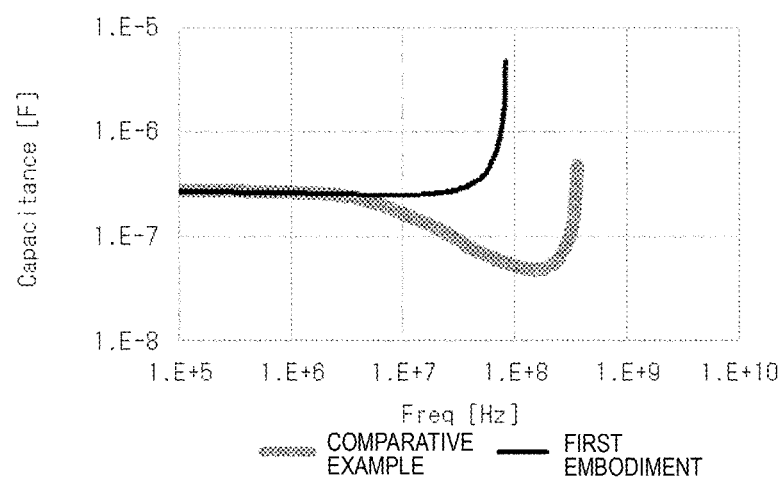
FIGS. 8A and 8B include graphs illustrating capacitance characteristics and ESL characteristics of the multi-terminal multilayer capacitor according to the first preferred embodiment of the present invention and the comparative example.
Figure 8B:
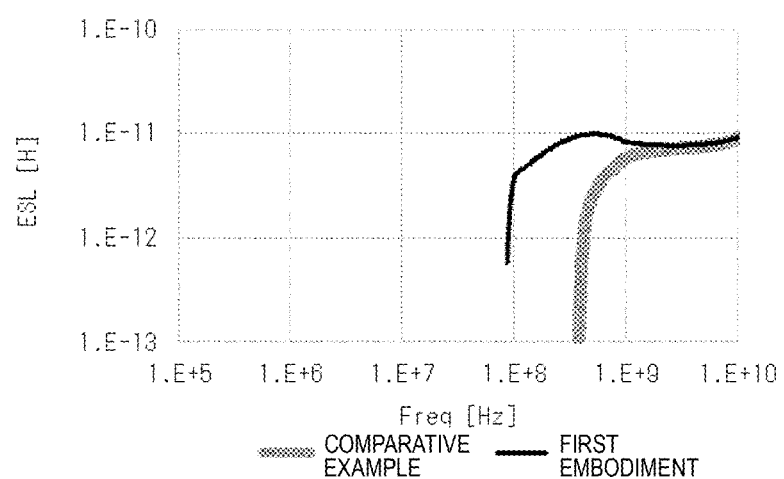

Next, capacitance characteristics and ESL characteristics of the multi-terminal multilayer capacitor 1 and the comparative example are illustrated in FIGS. 8A and 8B. FIG. 8A illustrates capacitance characteristics (simulation results) of the multi-terminal multilayer capacitor 1 and the comparative example, and FIG. 8B illustrates ESL characteristics (simulation results) of the multi-terminal multilayer capacitor 1 and the comparative example. In the graph of FIG. 8A, the horizontal axis represents frequency (Hz) and the vertical axis represents capacitance (F). Additionally, in the graph of FIG. 8B, the horizontal axis represents frequency (Hz) and the vertical axis represents ESL (H). As illustrated in FIG. 8A, in the comparative example, a decrease in capacitance was observed in a high-frequency region (particularly, a region of 10 MHz or higher), but according to the multi-terminal multilayer capacitor 1, it was confirmed that the capacitance did not decrease even in a high-frequency region (particularly, a region of 10 MHz or higher). In addition, as illustrated in FIG. 8B, it was confirmed that the multi-terminal multilayer capacitor 1 can keep the ESL low.

Second Preferred Embodiment

Figure 9A:
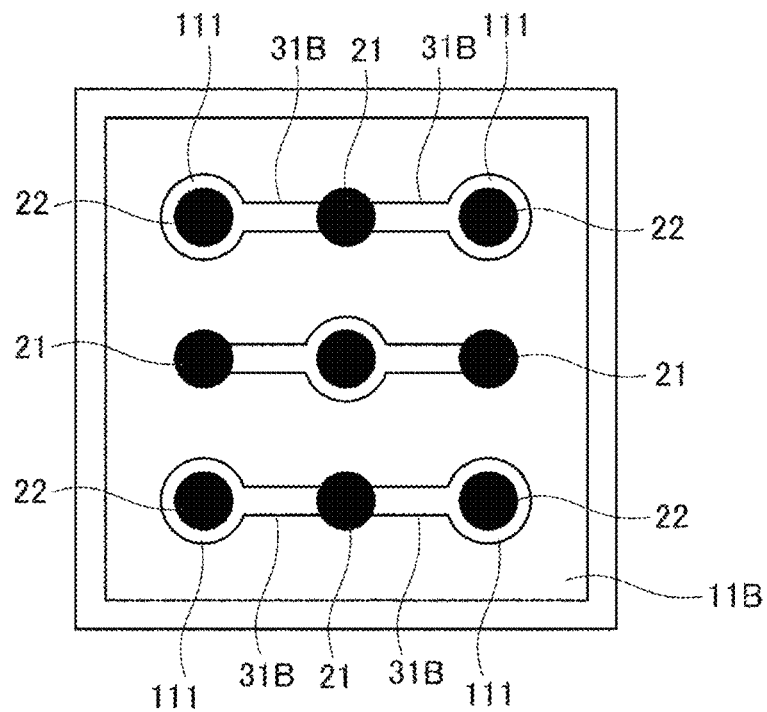
FIGS. 9A and 9B include plan views illustrating the configuration of a first internal electrode and a second internal electrode of a multi-terminal multilayer capacitor according to a second preferred embodiment of the present invention.
Figure 9B:
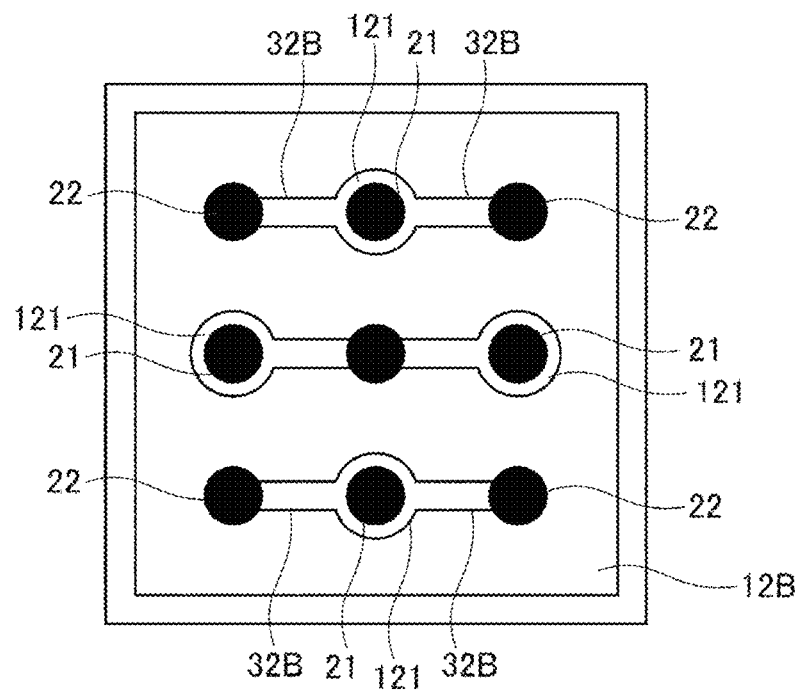

In the multi-terminal multilayer capacitor 1 according to the first preferred embodiment described above, the first slits 31 and the second slits 32 are positioned to define a lattice shape, but as illustrated in FIGS. 9A and 9B, first slits 31B and second slits 32B may be positioned to define three straight lines extending parallel or substantially parallel to the contours of a first internal electrode 11B and a second internal electrode 12B. FIGS. 9A and 9B include plan views illustrating the configuration of the first internal electrode 11B and the second internal electrode 12B of a multi-terminal multilayer capacitor 1B according to a second preferred embodiment.

Note that also in the present preferred embodiment, the first slit 31B and the second slit 32B overlap (coincide with) each other in a plan view. In this case, the first and second internal electrodes 11B and 12B do not have electrically divided (split) regions. The other configurations are the same as or similar to those of the multi-terminal multilayer capacitor 1 according to the first preferred embodiment described above, and thus detailed description thereof is omitted here.

Figure 10A:
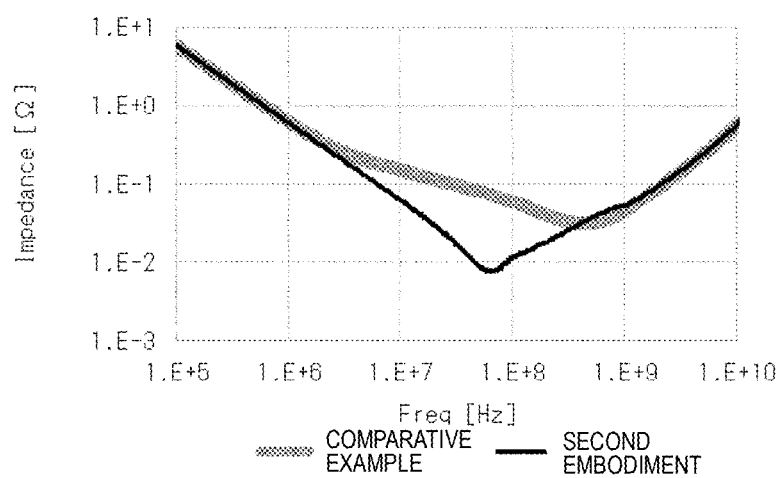
FIGS. 10A and 10B include graphs illustrating impedance characteristics and ESR characteristics of the multi-terminal multilayer capacitor according to the second preferred embodiment of the present invention and the comparative example.
Figure 10B:
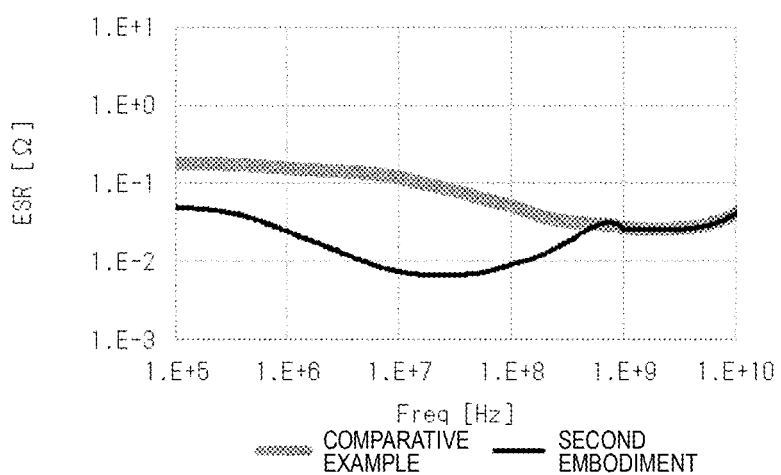

Here, impedance characteristics and ESR characteristics of the multi-terminal multilayer capacitor 1B according to the present preferred embodiment and the comparative example are illustrated in FIGS. 10A and 10B. FIG. 10A illustrates impedance characteristics (simulation results) of the multi-terminal multilayer capacitor 1B and the comparative example, and FIG. 10B illustrates ESR characteristics (simulation results) of the multi-terminal multilayer capacitor 1B and the comparative example. In the graph of FIG. 10A, the horizontal axis represents frequency (Hz) and the vertical axis represents impedance (Ω). Additionally, in the graph of FIG. 10B, the horizontal axis represents frequency (Hz) and the vertical axis represents ESR (Ω).

As illustrated in FIG. 10A, according to the multi-terminal multilayer capacitor 1B, it was confirmed that the impedance (particularly, the impedance in the vicinity of 100 MHz) was reduced as compared with the comparative example. In addition, as illustrated in FIG. 10B, according to the multi-terminal multilayer capacitor 1B, it was confirmed that the ESR was lowered as compared with the comparative example. In other words, it was confirmed that even the multi-terminal multilayer capacitor 1B according to the second preferred embodiment can also achieve effects equivalent to those of the multi-terminal multilayer capacitor 1 according to the first preferred embodiment described above.

Figure 11A:
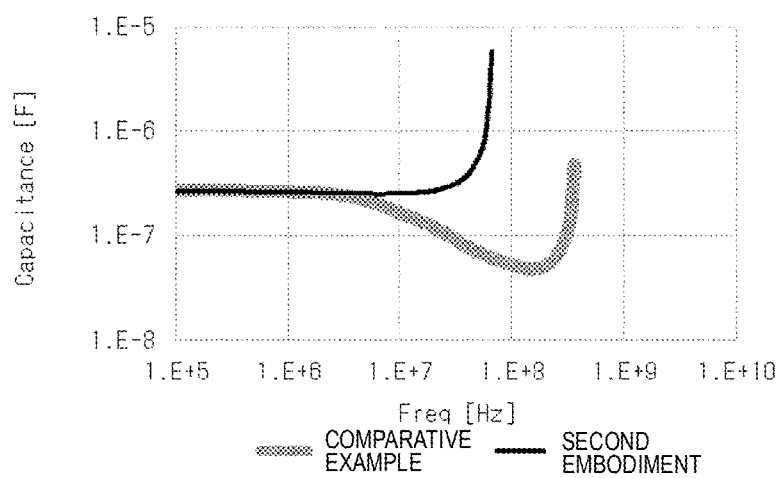
FIGS. 11A and 11B include graphs illustrating capacitance characteristics and ESL characteristics of the multi-terminal multilayer capacitor according to the second preferred embodiment of the present invention and the comparative example.
Figure 11B:
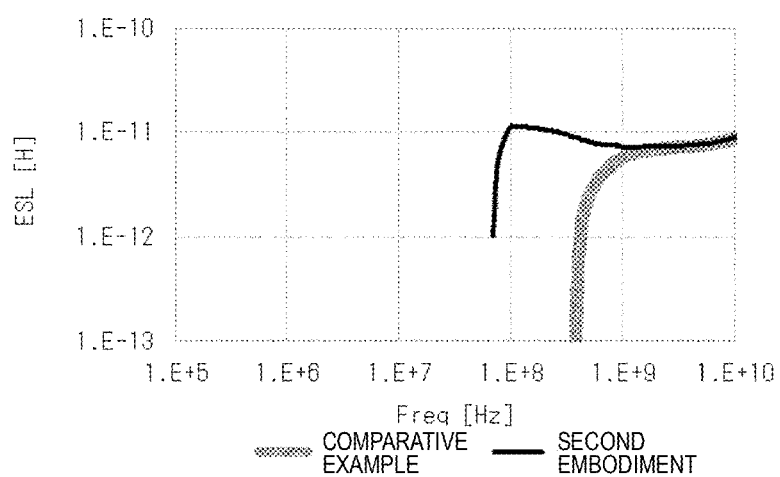

Next, capacitance characteristics and ESL characteristics of the multi-terminal multilayer capacitor 1B and the comparative example are illustrated in FIGS. 11A and 11B. FIG. 11A illustrates capacitance characteristics (simulation results) of the multi-terminal multilayer capacitor 1B and the comparative example, and FIG. 11B illustrates ESL characteristics (simulation results) of the multi-terminal multilayer capacitor 1B and the comparative example. In the graph of FIG. 11A, the horizontal axis represents frequency (Hz) and the vertical axis represents capacitance (F). Additionally, in the graph of FIG. 11B, the horizontal axis represents frequency (Hz) and the vertical axis represents ESL (H).

As illustrated in FIG. 11A, in the comparative example, a decrease in capacitance was observed in a high-frequency region (particularly, a region of 10 MHz or higher), but according to the multi-terminal multilayer capacitor 1B, it was confirmed that the capacitance did not decrease even in a high-frequency region (particularly, a region of 10 MHz or higher). In addition, as illustrated in FIG. 11B, it was confirmed that the multi-terminal multilayer capacitor 1B can keep the ESL low. In other words, it was confirmed that even the multi-terminal multilayer capacitor 1B according to the second preferred embodiment can also achieve effects equivalent to those of the multi-terminal multilayer capacitor 1 according to the first preferred embodiment described above.

Third Preferred Embodiment

Figure 12A:
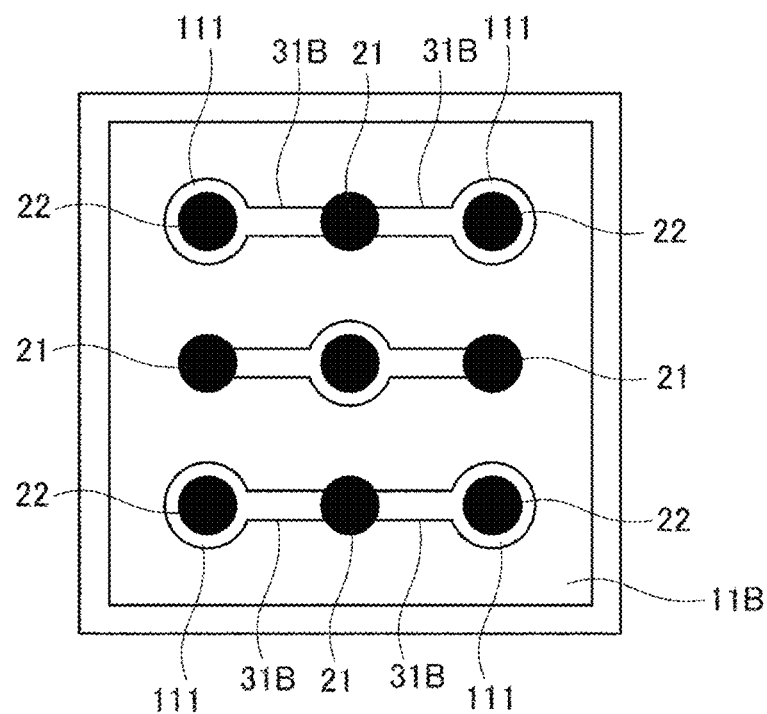
FIGS. 12A and 12B include plan views illustrating the configuration of a first internal electrode and a second internal electrode of a multi-terminal multilayer capacitor according to a third preferred embodiment of the present invention.
Figure 12B:
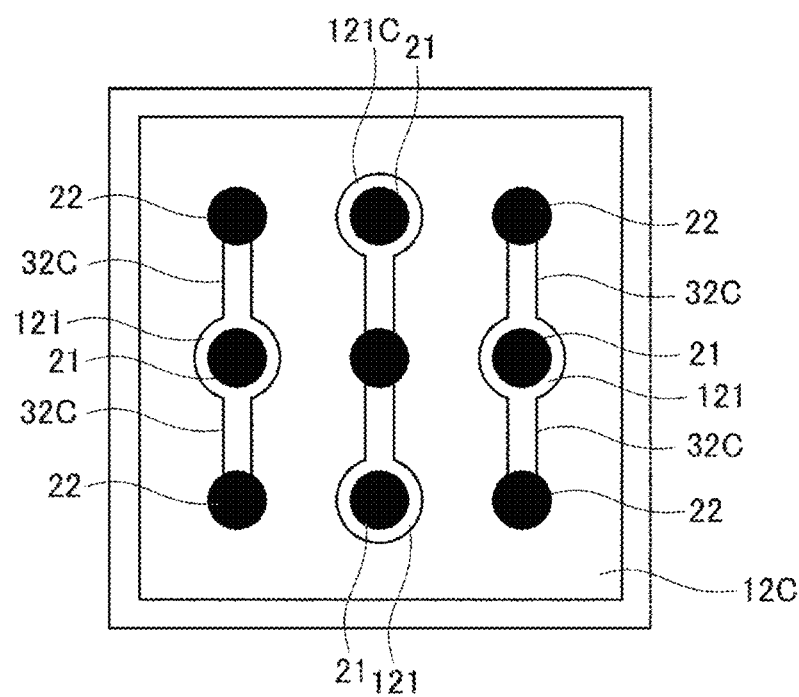

In the multi-terminal multilayer capacitor 1B according to the second preferred embodiment described above, the first slit 31B and the second slit 32B are positioned to define three straight lines so as to overlap each other, but as illustrated in FIGS. 12A and 12B, the direction in which a second slit 32C extends may be rotated by 90° with respect to the direction in which the first slit 31B extends. FIGS. 12A and 12B include plan views illustrating the configuration of the first internal electrode 11B and a second internal electrode 12C of a multi-terminal multilayer capacitor 1C according to a third preferred embodiment.

That is, the first slit 31B and the second slit 32C are perpendicular or substantially perpendicular to each other in a plan view. Therefore, in the present preferred embodiment, the first slit 31B and the second slit 32C do not overlap each other (that is, do not coincide with each other) in a plan view. Also, in this case, the first and second internal electrodes 11B and 12C do not have electrically divided (split) regions. The other configurations are the same as or similar to those of the multi-terminal multilayer capacitor 1B according to the second preferred embodiment described above, and therefore detailed description thereof is omitted here.

According to the present preferred embodiment, since the first slit 31B and the second slit 32C do not overlap (i.e., do not coincide with each other) in a plan view, the magnetic field entering and leaving the first slit 31B and the second slit 32C is not linearly distributed (i.e., outside of the optimum condition), but effects substantially equivalent to those of the multi-terminal multilayer capacitor 1B according to the second preferred embodiment described above can be achieved.

Fourth Preferred Embodiment

Figure 13A:
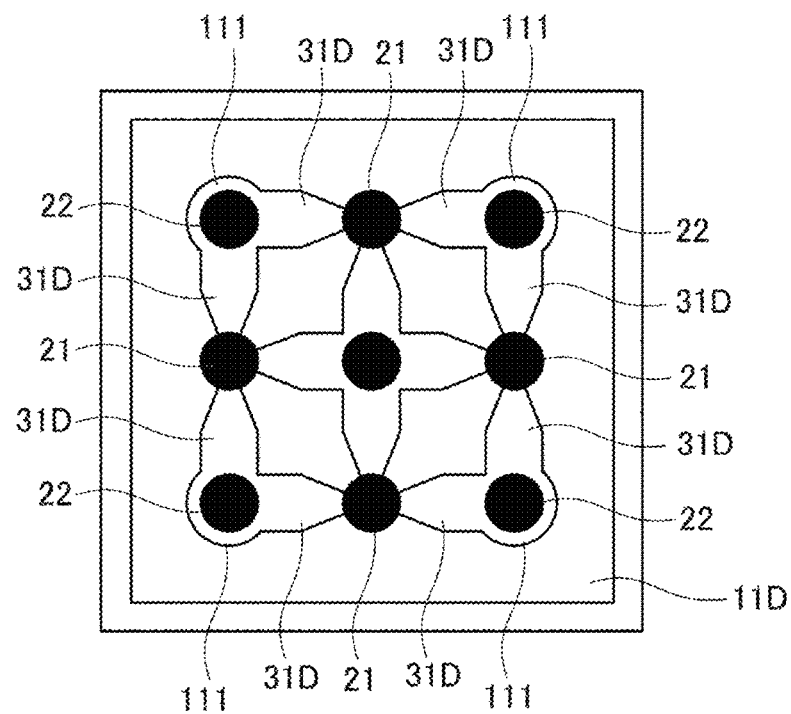
FIGS. 13A and 13B include plan views illustrating the configuration of a first internal electrode and a second internal electrode of a multi-terminal multilayer capacitor according to a fourth preferred embodiment of the present invention.
Figure 13B:
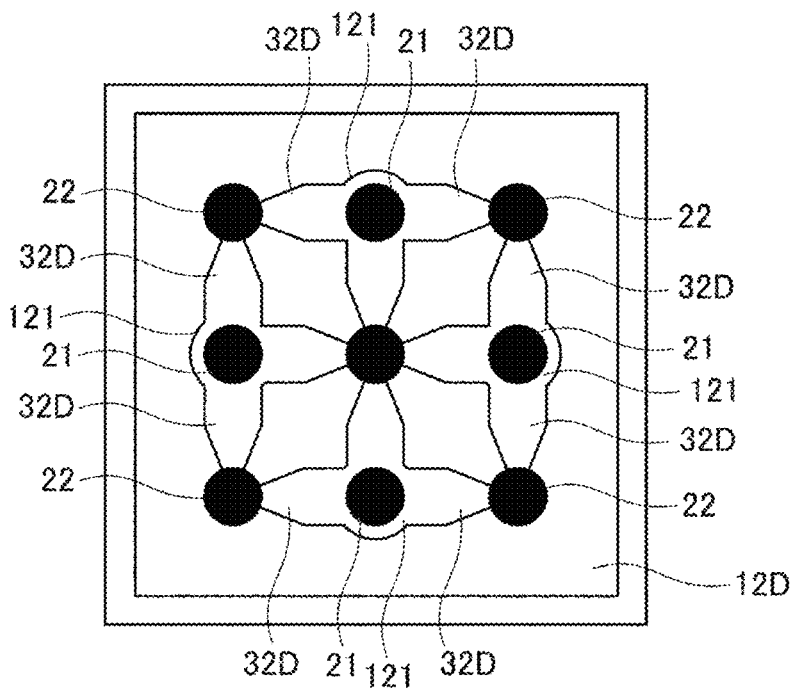

In the multi-terminal multilayer capacitor 1 according to the first preferred embodiment described above, the widths of the first slit 31 and the second slit 32 are constant, but as illustrated in FIGS. 13A and 13B, a first slit 31D may be formed in a tapered shape that narrows toward the first via 21. Similarly, a second slit 32D may have a tapered shape that narrows toward the second via 22. FIGS. 13A and 13B include plan views illustrating the configuration of a first internal electrode 11D and a second internal electrode 12D of a multi-terminal multilayer capacitor 1D according to a fourth preferred embodiment. The other configurations are the same as or similar to those of the multi-terminal multilayer capacitor 1 according to the first preferred embodiment described above, and thus detailed description thereof is omitted here.

According to the present preferred embodiment, by forming the first and second slits 31D and 32D in a tapered shape, the conductive connection between the first and second internal electrodes 11D and 12D and the first and second vias 21 and 22 can be reliably achieved, and the influence of positional deviation or the like (variation) can be reduced. In addition, when the element is fired in the manufacturing process, the element is similarly contracted, however, by forming the first and second slits 31D and 32D in a tapered shape, the shapes of the first and second slits 31D and 32D can be favorably secured (maintained) even after the firing.

Fifth Preferred Embodiment

With respect to the multi-terminal multilayer capacitor 1 according to the first preferred embodiment described above, a land pattern may be provided at the connecting portions between the first and second vias 21 and 22 and the first and second slits 31 and 32.

Figure 14A:
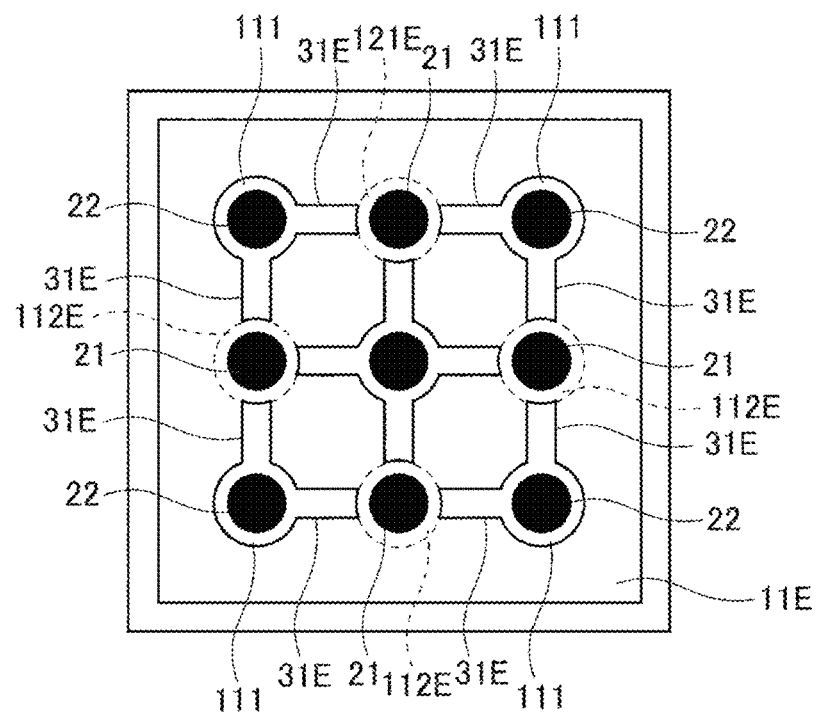
FIGS. 14A and 14B include plan views illustrating the configuration of a first internal electrode and a second internal electrode of a multi-terminal multilayer capacitor according to a fifth preferred embodiment of the present invention.
Figure 14B:
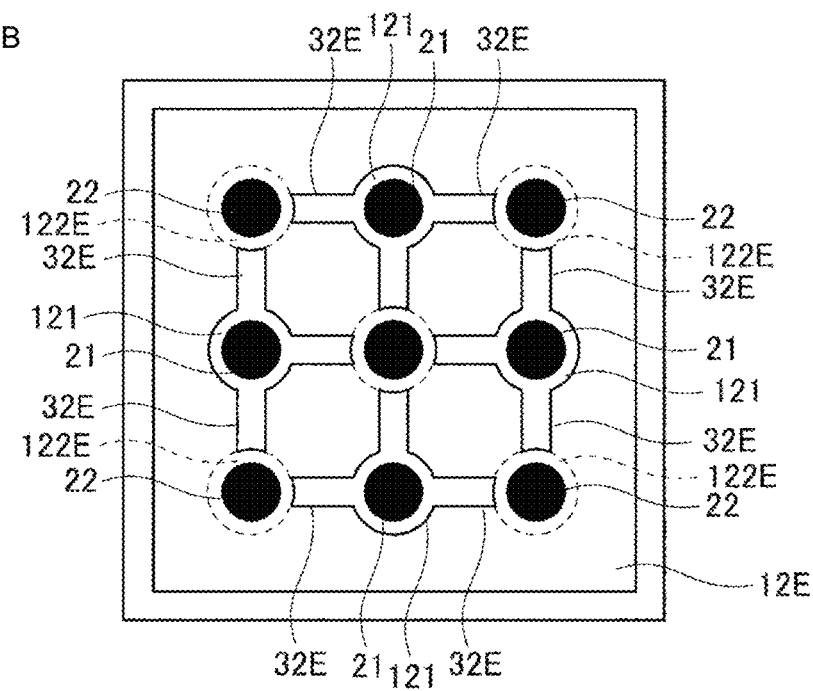

To be more specific, as illustrated in FIGS. 14A and 14B, the connecting portion of a first internal electrode 11E to the first via 21 preferably has an annular shape. That is, an annular first land pattern 112E is located around the first via 21 penetrating the first internal electrode 11E. Similarly, the connecting portion of a second internal electrode 12E to the second via 22 preferably has an annular shape. That is, an annular second land pattern 122E is located around the second via 22 penetrating the second internal electrode 12E. Note that FIGS. 14A and 14B include plan views illustrating the configuration of the first internal electrode 11E and the second internal electrode 12E of a multi-terminal multilayer capacitor 1E according to a fifth preferred embodiment.

A first slit 31E connects between the first insulating portion 111 and the first land pattern 112E (first via 21). Similarly, a second slit 32E connects between the second insulating portion 121 and the second land pattern 122E (second via 22). Note that the diameters of the first and second land patterns 112E and 122E are larger than the widths of the first and second slits 31E and 32E and are larger than the diameters of the first and second vias 21 and 22. The other configurations are the same as or similar to those of the multi-terminal multilayer capacitor 1 according to the first preferred embodiment described above, and thus detailed description thereof is omitted here.

According to the present preferred embodiment, by providing the first and second land patterns 112E and 122E, the conductive connection between the first and second internal electrodes 11E and 12E and the first and second vias 21 and 22 can be reliably achieved, and the influence of positional deviation or the like (variation) can be reduced.

Sixth Preferred Embodiment

Figure 15A:
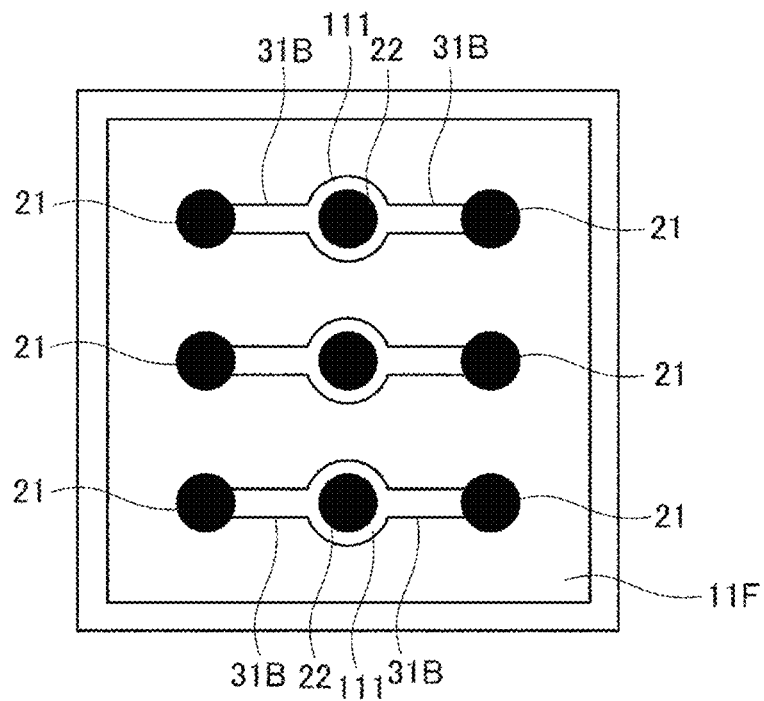
FIGS. 15A and 15B include plan views illustrating the configuration of a first internal electrode and a second internal electrode of a multi-terminal multilayer capacitor according to a sixth preferred embodiment of the present invention.
Figure 15B:
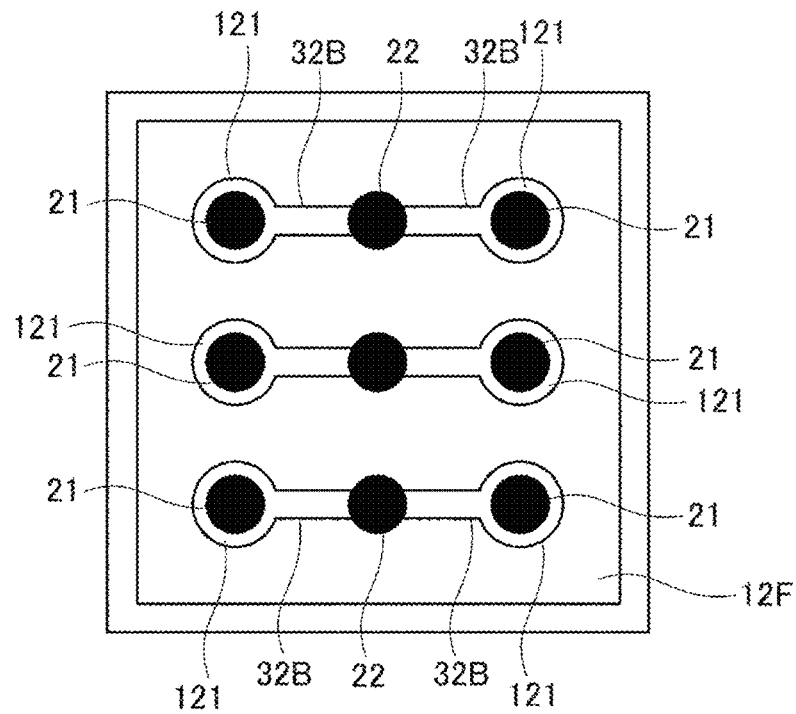
Figure 16:
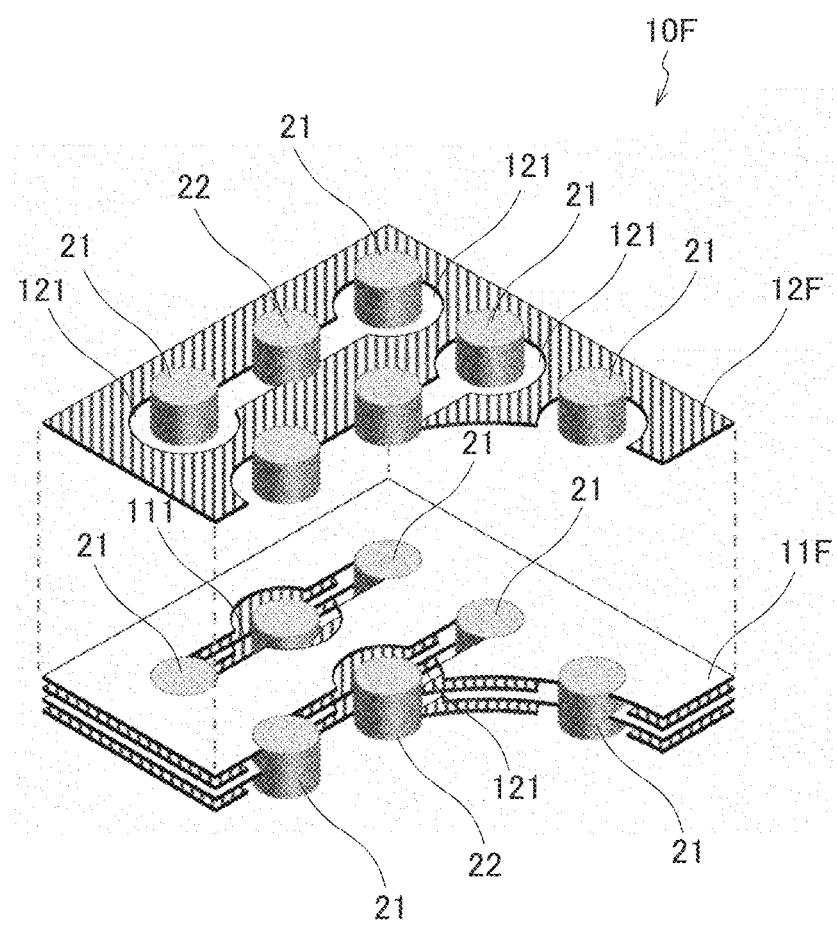
FIG. 16 is an exploded perspective view illustrating the internal structure of the multi-terminal multilayer capacitor according to the sixth preferred embodiment of the present invention.

The multi-terminal multilayer capacitor 1B according to the second preferred embodiment described above has the configuration in which the first external terminals 41 (first vias 21) and the second external terminals 42 (second vias 22) are alternately arranged, but as illustrated in FIGS. 15A and 15B and FIG. 16, a configuration may be adopted in which the plurality of (three in the present preferred embodiment) first external terminals 41 (first vias 21) is linearly aligned (i.e., aligned with the same polarity) and the plurality of (for example, three in the present preferred embodiment) second external terminals 42 (second vias 22) is linearly aligned (i.e., aligned with the same polarity) in a plan view. Note that FIGS. 15A and 15B include plan views illustrating the configuration of a first internal electrode 11F and a second internal electrode 12F of a multi-terminal multilayer capacitor 1F according to a sixth preferred embodiment. In addition, FIG. 16 is an exploded perspective view illustrating the internal structure of the multi-terminal multilayer capacitor 1F.

In this case, the plurality of (for example, three) linearly aligned first external terminals 41 (first vias 21) and the plurality of (for example, three) linearly aligned second external terminals 42 (second vias 22) are alternately arranged (for example, nine terminals). The other configurations are the same as or similar to those of the multi-terminal multilayer capacitor 1 according to the first preferred embodiment described above, and thus detailed description thereof is omitted here.

By arranging the first external terminal 41 (first via 21) and the second external terminal 42 (second via 22) as described above (i.e., by aligning the first and second external terminals 41 and 42 with the same polarity) and designing the land pattern of the mounting substrate to match the layout of the first and second external terminals 41 and 42, mounting on a linear line such as a microstrip line or a coplanar line becomes easy (possible). In particular, when the first and second external terminals 41 and 42 are positioned in three rows, they are arranged in a ground-signal-ground (GSG) arrangement, and through-type capacitors are connected together to define a single chip configuration. As such, handling at the time of mounting is facilitated.

Figure 17A:
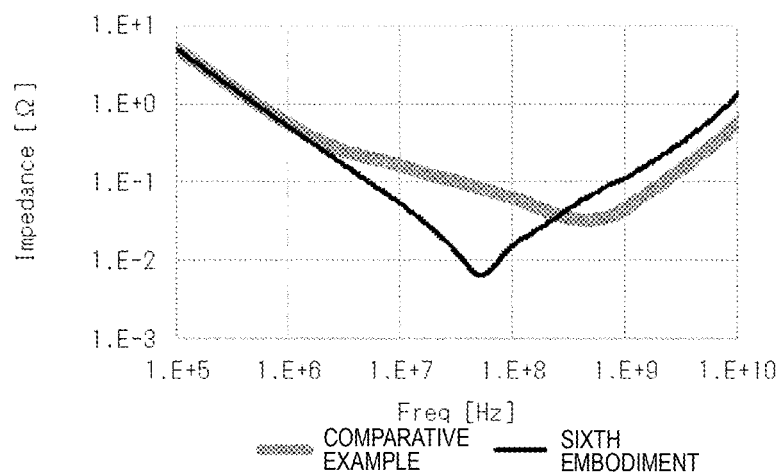
FIGS. 17A and 17B include graphs illustrating impedance characteristics and ESR characteristics of the multi-terminal multilayer capacitor according to the sixth preferred embodiment of the present invention and the comparative example.
Figure 17B:
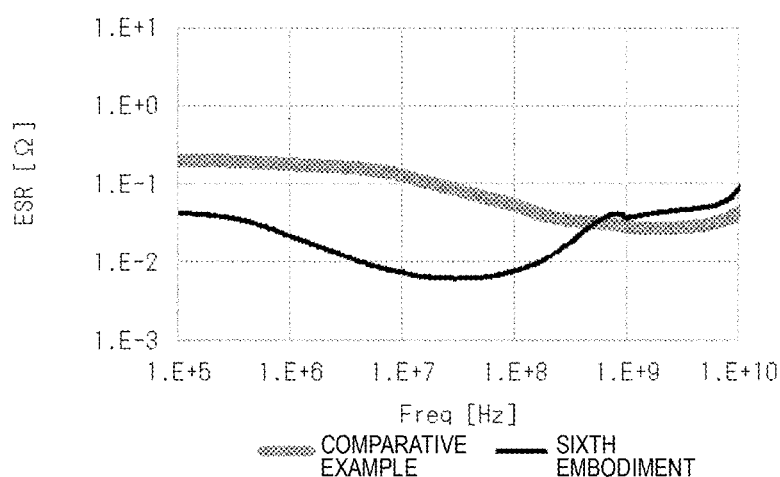

Here, impedance characteristics and ESR characteristics of the multi-terminal multilayer capacitor 1F according to the present preferred embodiment and the comparative example are illustrated in FIGS. 17A and 17B. FIG. 17A illustrates impedance characteristics (simulation results) of the multi-terminal multilayer capacitor 1F and the comparative example, and FIG. 17B illustrates ESR characteristics (simulation results) of the multi-terminal multilayer capacitor 1F and the comparative example. In the graph of FIG. 17A, the horizontal axis represents frequency (Hz) and the vertical axis represents impedance ($\Omega$). Additionally, in the graph of FIG. 17B, the horizontal axis represents frequency (Hz) and the vertical axis represents ESR ($\Omega$).

As illustrated in FIG. 17A, according to the multi-terminal multilayer capacitor 1F, it was confirmed that the impedance (particularly, the impedance at or below 100 MHz) was reduced as compared with the comparative example. In addition, as illustrated in FIG. 17B, according to the multi-terminal multilayer capacitor 1F, it was confirmed that the ESR was lowered as compared with the comparative example. That is, it was confirmed that even the multi-terminal multilayer capacitor 1F according to the sixth preferred embodiment can also achieve effects equivalent to those of the multi-terminal multilayer capacitor 1B according to the second preferred embodiment described above.

Figure 18A:
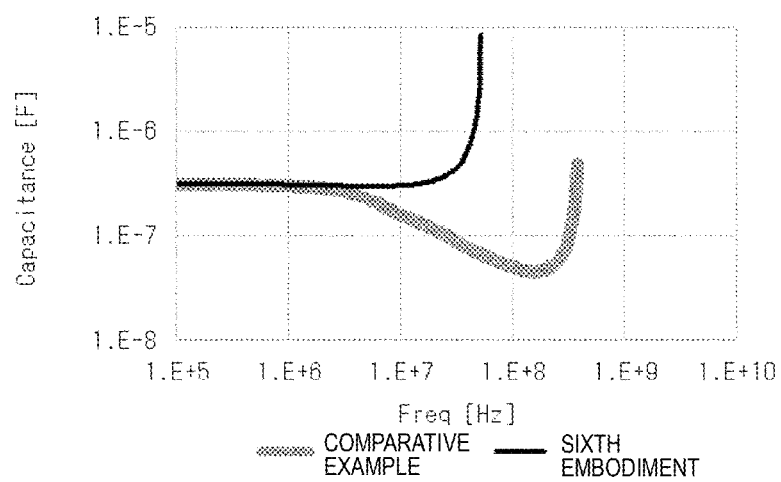
FIGS. 18A and 18B include graphs illustrating capacitance characteristics and ESL characteristics of the multi-terminal multilayer capacitor according to the sixth preferred embodiment of the present invention and the comparative example.
Figure 18B:
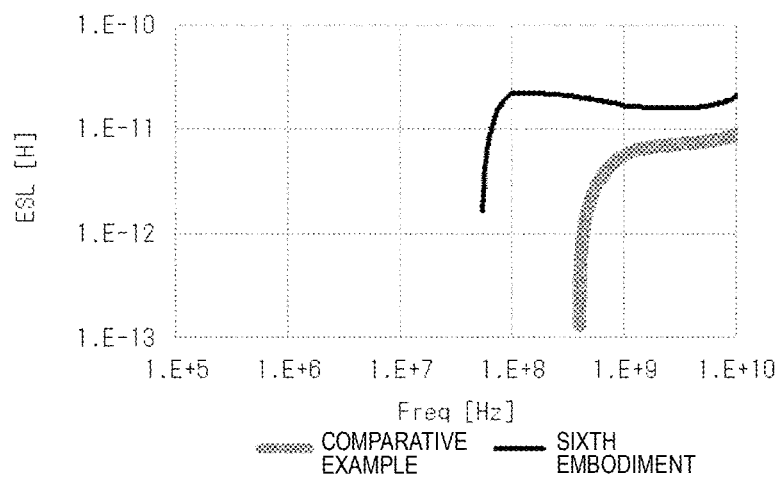

Next, capacitance characteristics and ESL characteristics of the multi-terminal multilayer capacitor 1F and the comparative example are illustrated in FIGS. 18A and 18B. FIG. 18A illustrates capacitance characteristics (simulation results) of the multi-terminal multilayer capacitor 1F and the comparative example, and FIG. 18B illustrates ESL characteristics (simulation results) of the multi-terminal multilayer capacitor 1F and the comparative example. In the graph of FIG. 18A, the horizontal axis represents frequency (Hz) and the vertical axis represents capacitance (F). Additionally, in the graph of FIG. 18B, the horizontal axis represents frequency (Hz) and the vertical axis represents ESL (H).

As illustrated in FIG. 18A, in the comparative example, a decrease in capacitance was observed in a high-frequency region (particularly, a region of 10 MHz or higher), but according to the multi-terminal multilayer capacitor 1F, it was confirmed that the capacitance did not decrease even in a high-frequency region (particularly, a region of about 10 MHz or higher). In addition, as illustrated in FIG. 18B, it was confirmed that, according to the multi-terminal multilayer capacitor 1F, although the ESL was slightly higher than that of the comparative example, the ESL could be maintained relatively low. In other words, it was confirmed that the multi-terminal multilayer capacitor 1F according to the sixth preferred embodiment can also achieve effects substantially equivalent to those of the multi-terminal multilayer capacitor 1B according to the second preferred embodiment described above.

Seventh Preferred Embodiment

Figure 19A:
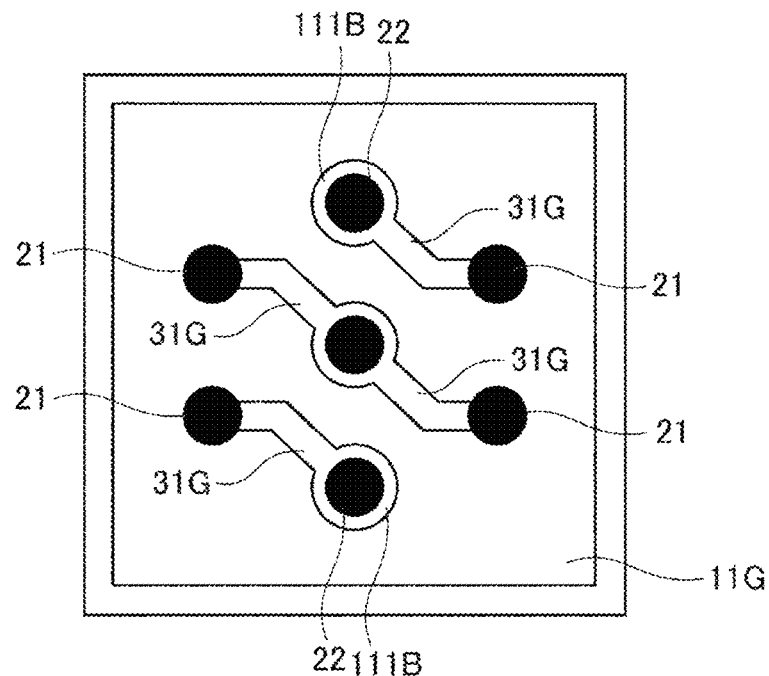
FIGS. 19A and 19B include plan views illustrating the configuration of a first internal electrode and a second internal electrode of a multi-terminal multilayer capacitor according to a seventh preferred embodiment of the present invention.
Figure 19B:
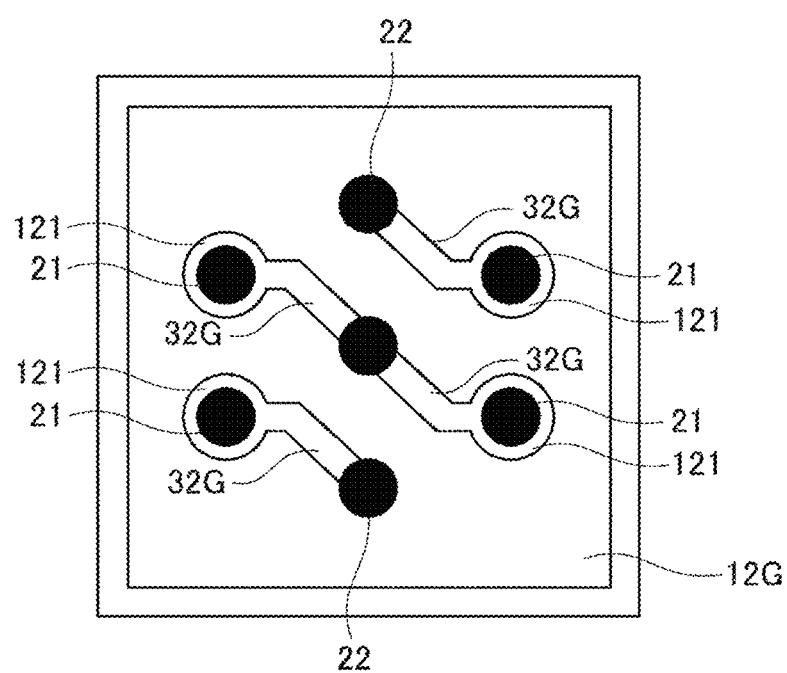

With respect to the multi-terminal multilayer capacitor 1F according to the sixth preferred embodiment described above, as illustrated in FIGS. 19A and 19B, a configuration may be adopted in which the plurality of (for example, two in the present preferred embodiment) first external terminals 41 (first vias 21) is linearly aligned (i.e., aligned with the same polarity), the plurality of (for example, three in the present preferred embodiment) second external terminals 42 (second vias 22) is linearly aligned (i.e., aligned with the same polarity), and the plurality of (for example, two) linearly aligned first external terminals 41 (first vias 21) and the plurality of (three) linearly aligned second external terminals 42 (second vias 22) are alternately arranged in a staggered manner (i.e., offset by a half pitch) in a plan view (seven terminals).

Furthermore, in the present preferred embodiment, a first slit 31G extends in a direction oblique to the contour of a first internal electrode 11G, and a second slit 32G extends in a direction oblique to the contour of a second internal electrode 12G. Note that FIGS. 19A and 19B include plan views illustrating the configuration of the first internal electrode 11G and the second internal electrode 12G of a multi-terminal multilayer capacitor 1G according to a seventh preferred embodiment. Other configurations are the same or similar to those of the multi-terminal multilayer capacitor 1 (according to the first preferred embodiment) described above, and thus detailed description thereof will be omitted here.

By arranging the first external terminal 41 (first via 21) and the second external terminal 42 (second via 22) as described above (i.e., by aligning the first and second external terminals 41 and 42 with the same polarity) and designing the land pattern of the mounting substrate to match the layout of the first and second external terminals 41 and 42, mounting on a linear line such as a microstrip line or a coplanar line becomes easy (possible). In particular, when the first and second external terminals 41 and 42 are positioned to define three rows, they are arranged in a ground-signal-ground (GSG) arrangement, and through-type capacitors are connected together to define a single chip configuration. As such, handling at the time of mounting is facilitated.

The multi-terminal multilayer capacitor 1G according to the present preferred embodiment can also achieve effects equivalent to those of the multi-terminal multilayer capacitor 1F according to the sixth preferred embodiment described above.

Eighth Preferred Embodiment

Figure 20A:
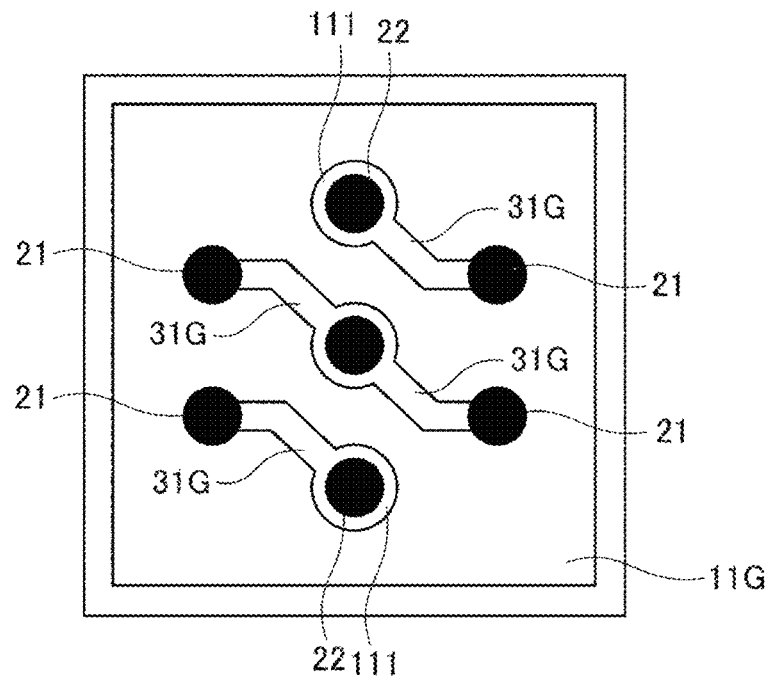
FIGS. 20A and 20B include plan views illustrating the configuration of a first internal electrode and a second internal electrode of a multi-terminal multilayer capacitor according to an eighth preferred embodiment of the present invention.
Figure 20B:
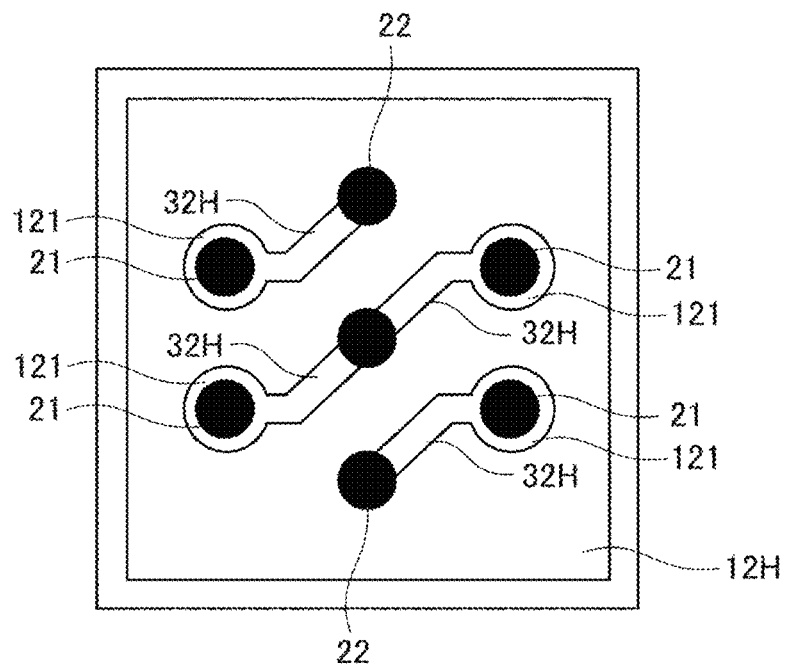

With respect to the multi-terminal multilayer capacitor 1G according to the seventh preferred embodiment described above, as illustrated in FIGS. 20A and 20B, the shape of a slit 32H of a second internal electrode 12H may be left-right symmetrical (left-right reversed). FIGS. 20A and 20B include plan views illustrating the configuration of the first internal electrode 11G and the second internal electrode 12H of a multi-terminal multilayer capacitor 1H according to an eighth preferred embodiment.

In the present preferred embodiment, the first slit 31G and the second slit 32H do not overlap with each other (that is, do not coincide with each other) in a plan view. The other configurations are the same as or similar to those of the multi-terminal multilayer capacitor 1G according to the seventh preferred embodiment described above, and therefore detailed description thereof is omitted here.

By arranging the first external terminal 41 (first via 21) and the second external terminal 42 (second via 22) as described above (i.e., by aligning the first and second external terminals 41 and 42 with the same polarity) and designing the land pattern of the mounting substrate to match the layout of the first and second external terminals 41 and 42, mounting on a linear line such as a microstrip line or a coplanar line becomes easy (possible). In particular, when the first and second external terminals 41 and 42 are positioned to define three rows, they are arranged in a ground-signal-ground (GSG) arrangement, and through-type capacitors are connected together to define a single chip configuration. As such, handling at the time of mounting is facilitated.

According to the present preferred embodiment, surface paths of the first and second vias 21 and 22 and the first and second internal electrodes 11G and 12H become long, and current paths passing through the first and second slits 31G and 32H are not shortest. As a result, the impedance and ESR of the current path increase, and the Joule loss of the multi-terminal multilayer capacitor 1H as a whole also increases. When a capacitor is used to decouple a power supply circuit, since there is a design method in which noise is suppressed by actively increasing the ESR, the present preferred embodiment is effective in such a case.

Ninth Preferred Embodiment

Figure 21A:
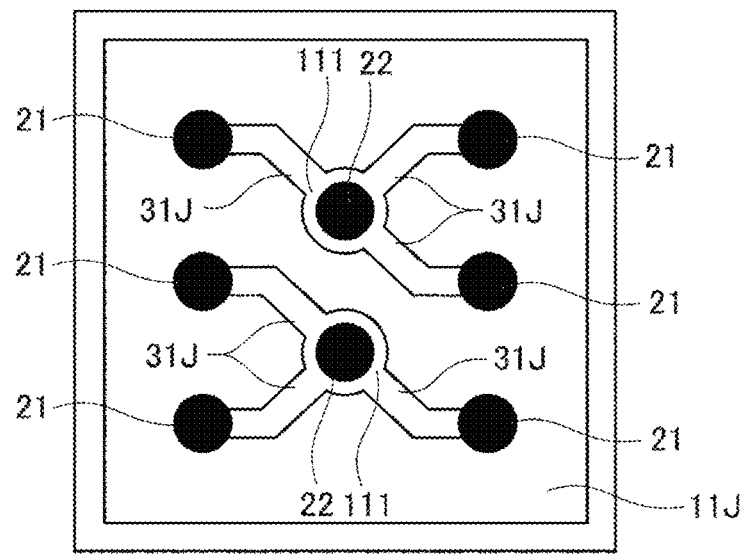
FIGS. 21A and 21B include plan views illustrating the configuration of a first internal electrode and a second internal electrode of a multi-terminal multilayer capacitor according to a ninth preferred embodiment of the present invention.
Figure 21B:
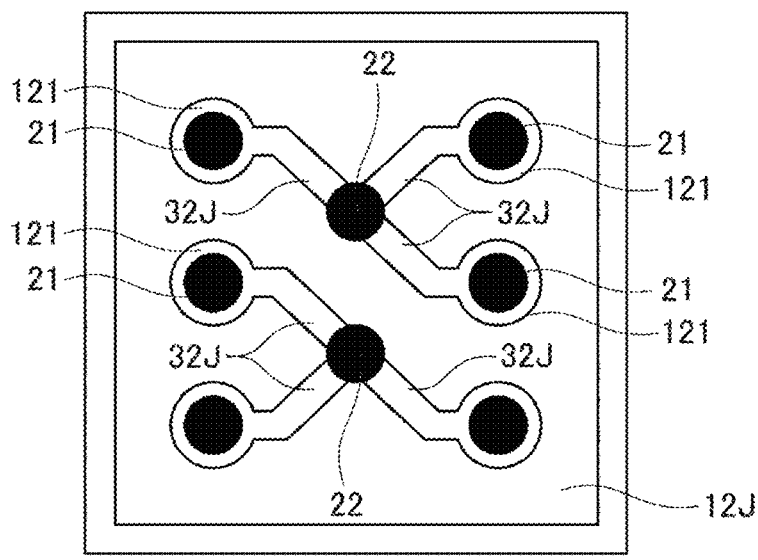

The multi-terminal multilayer capacitor 1G according to the seventh preferred embodiment described above has the configuration in which the plurality of (for example, two) linearly aligned first external terminals 41 (first vias 21) and the plurality of (three) linearly aligned second external terminals 42 (second vias 22) are alternately arranged in a staggered manner (i.e., shifted by a half pitch), but as illustrated in FIGS. 21A and 21B, a configuration may be adopted in which the plurality of (three) linearly aligned first external terminals 41 (first vias 21) and the plurality of (for example, two) linearly aligned second external terminals 42 (second vias 22) are alternately arranged in a staggered manner (i.e., shifted by a half pitch) in a plan view (eight terminals).

Furthermore, in the present preferred embodiment, a first slit 31J extends in an oblique direction (y-shape) with respect to the contour of a first internal electrode 11J, and a second slit 32J extends in an oblique direction (y-shape) with respect to the contour of a second internal electrode 12J. Note that FIGS. 21A and 21B include plan views illustrating the configuration of the first internal electrode 11J and the second internal electrode 12J of a multi-terminal multilayer capacitor 1J according to a ninth preferred embodiment. The other configurations are the same as or similar to those of the multi-terminal multilayer capacitor 1G according to the seventh preferred embodiment described above, and therefore detailed description thereof is omitted here.

By arranging the first external terminal 41 (first via 21) and the second external terminal 42 (second via 22) as described above (i.e., by aligning the first and second external terminals 41 and 42 with the same polarity) and designing the land pattern of the mounting substrate to match the layout of the first and second external terminals 41 and 42, mounting on a linear line such as a microstrip line or a coplanar line becomes easy (possible). In particular, when the first and second external terminals 41 and 42 are positioned in three rows, they are arranged in a ground-signal-ground (GSG) arrangement, and through-type capacitors are connected together to define a single chip configuration. As such, handling at the time of mounting is facilitated.

The multi-terminal multilayer capacitor 1J according to the present preferred embodiment can also achieve effects equivalent to those of the multi-terminal multilayer capacitor 1G according to the seventh preferred embodiment described above.

Tenth Preferred Embodiment

Figure 22A:
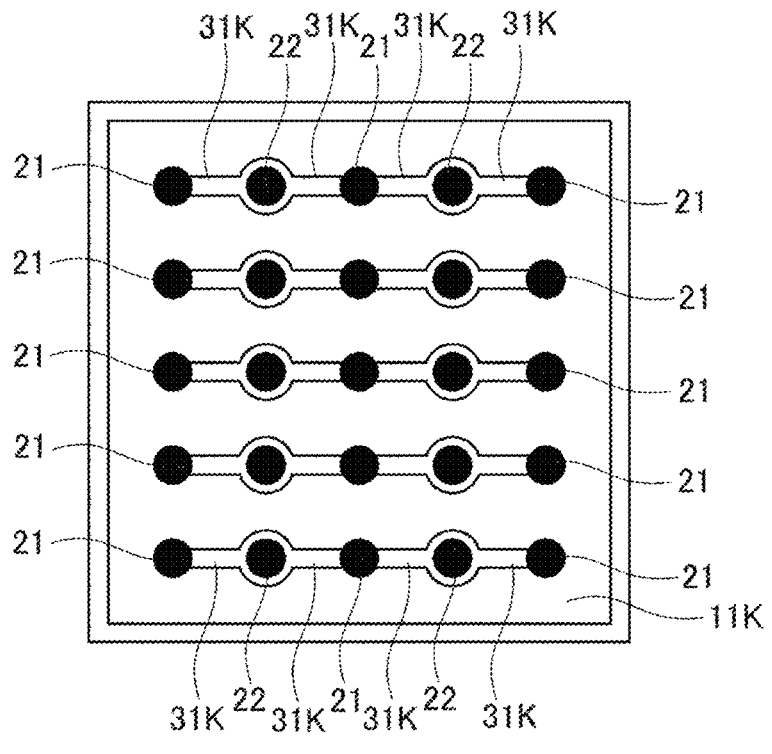
FIGS. 22A and 22B include plan views illustrating the configuration of a first internal electrode and a second internal electrode of a multi-terminal multilayer capacitor according to a tenth preferred embodiment of the present invention.
Figure 22B:
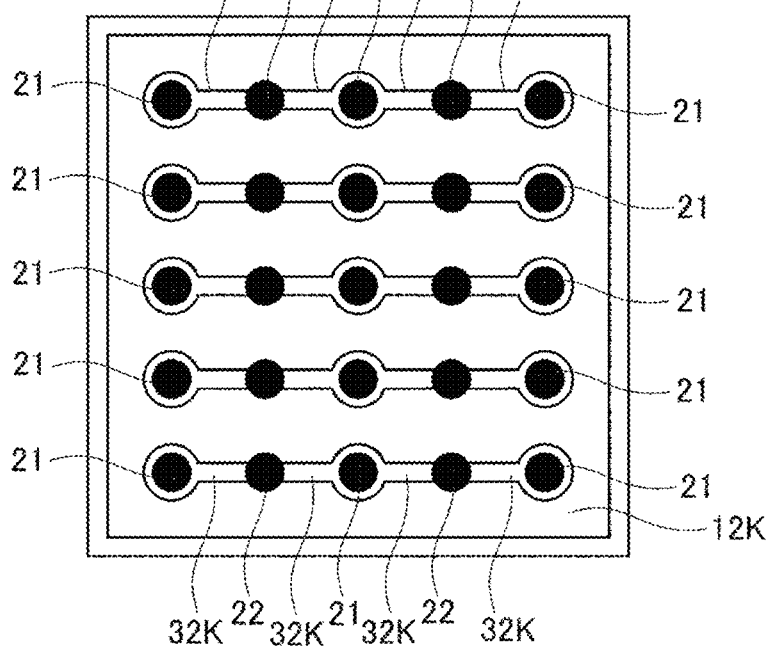

The multi-terminal multilayer capacitor 1F according to the sixth preferred embodiment described above has the configuration in which the plurality of (for example, three) linearly aligned first external terminals 41 (first vias 21) and the plurality of (for example, three) linearly aligned second external terminals 42 (second vias 22) are alternately arranged (3×3 (3 rows×3 columns)=9 terminals), but as illustrated in FIGS. 22A and 22B, a configuration may be adopted in which the plurality of (for example, five) linearly aligned first external terminals 41 (first vias 21) and the plurality of (for example, five) linearly aligned second external terminals 42 (second vias 22) are alternately arranged (5×5 (5 rows×5 columns)=25 terminals). Note that FIGS. 22A and 22B include plan views illustrating the configuration of a first internal electrode 11K and a second internal electrode 12K of a multi-terminal multilayer capacitor 1K according to a tenth preferred embodiment. The other configurations are the same as or similar to those of the multi-terminal multilayer capacitor 1F according to the sixth preferred embodiment described above, and therefore detailed description thereof is omitted here.

According to the multi-terminal multilayer capacitor 1K of the present preferred embodiment, the areas of the first and second internal electrodes 11K, 12K are increased. This increases the capacitance of the multi-terminal multilayer capacitor 1K as a whole.

Eleventh Preferred Embodiment

Figure 23A:
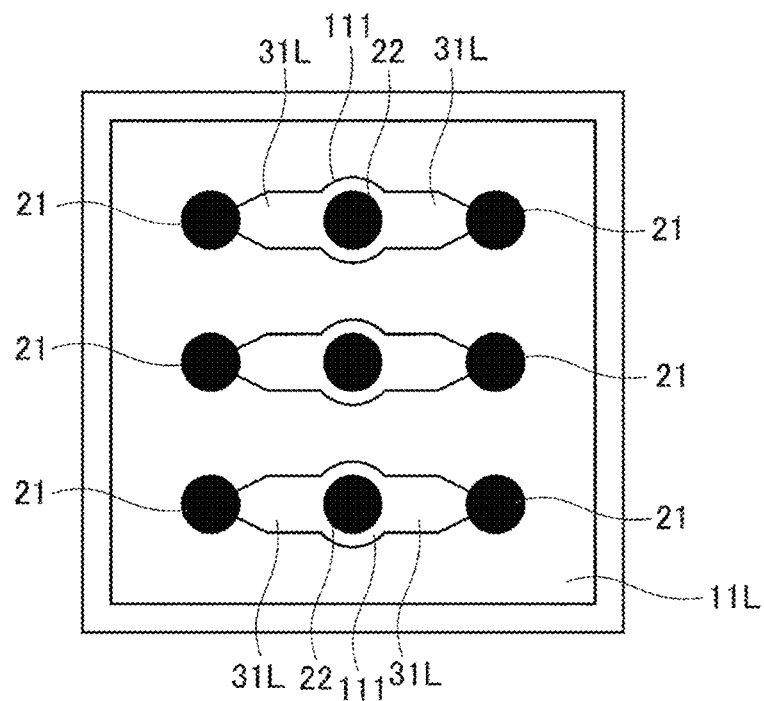
FIGS. 23A and 23B include plan views illustrating the configuration of a first internal electrode and a second internal electrode of a multi-terminal multilayer capacitor according to an eleventh preferred embodiment of the present invention.
Figure 23B:
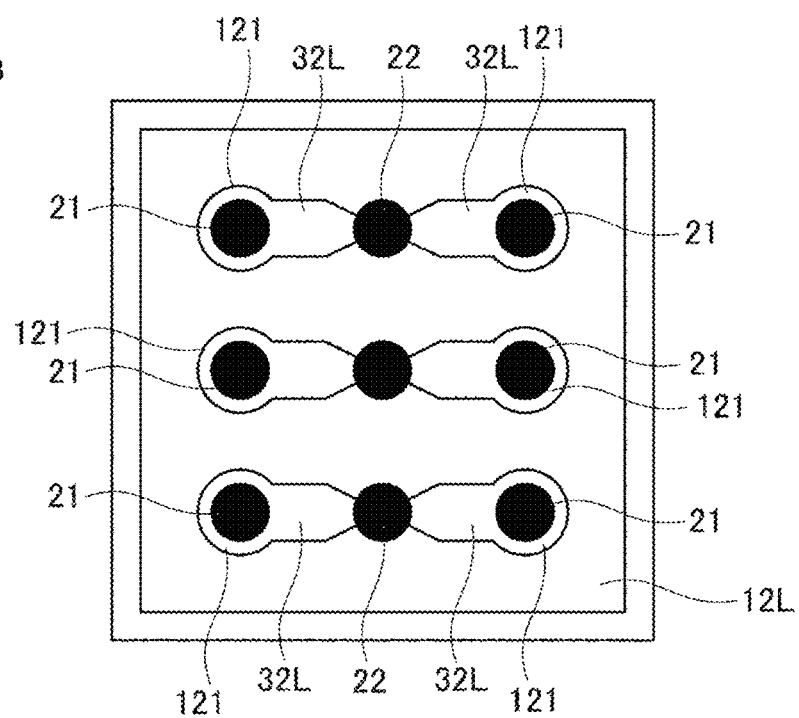

In the multi-terminal multilayer capacitor 1F according to the sixth preferred embodiment described above, the widths of the first slit 31F and the second slit 32F are constant, but as illustrated in FIGS. 23A and 23B, a first slit 31L may have a tapered shape that narrows toward the first via 21. Similarly, the second slit 32L may have a tapered shape that narrows toward the second via 22. FIGS. 23A and 23B include plan views illustrating the configuration of a first internal electrode 11L and a second internal electrode 12L of a multi-terminal multilayer capacitor 1L according to an eleventh preferred embodiment. The other configurations are the same as or similar to those of the multi-terminal multilayer capacitor 1F according to the sixth preferred embodiment described above, and therefore detailed description thereof is omitted here.

According to the present preferred embodiment, by providing the first and second slits 31L and 32L in a tapered shape, the conductive connection between the first and second internal electrodes 11L and 12L and the first and second vias 21 and 22 can be reliably achieved, and the influence of positional deviation or the like (variation) can be reduced. In addition, when the element is fired in the manufacturing process, the element is similarly contracted, however, by providing the first and second slits 31L and 32L with a tapered shape, the shapes of the first and second slits 31L and 32L can be favorably secured (maintained) even after the firing.

Twelfth Preferred Embodiment

With respect to the multi-terminal multilayer capacitor 1F according to the sixth preferred embodiment described above, land patterns may be provided at the connecting portions between the first and second vias 21 and 22 and the first and second slits 31F and 32F.

Figure 24A:
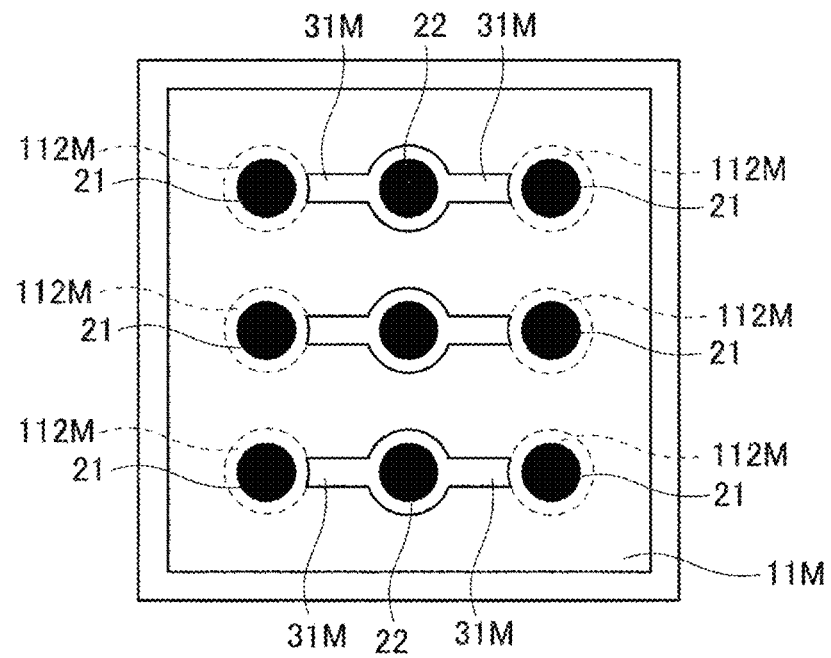
FIGS. 24A and 24B include plan views illustrating the configuration of a first internal electrode and a second internal electrode of a multi-terminal multilayer capacitor according to a twelfth preferred embodiment of the present invention.
Figure 24B:
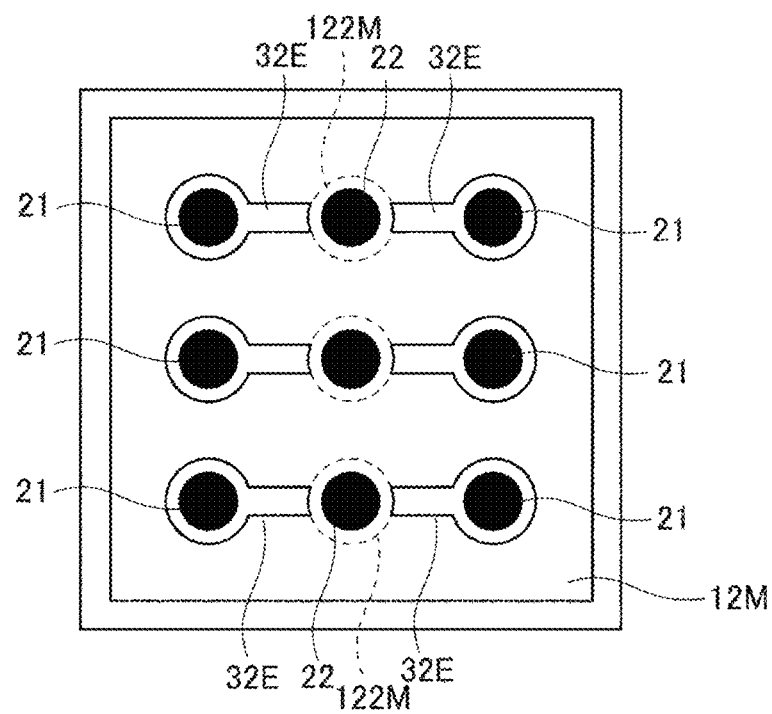

To be more specific, as illustrated in FIGS. 24A and 24B, the connecting portion of a first internal electrode 11M to the first via 21 preferably has an annular shape. That is, an annular first land pattern 112M is located around the first via 21 penetrating the first internal electrode 11M. Similarly, the connecting portion of a second internal electrode 12M to the second vias 22 preferably has an annular shape. That is, an annular second land pattern 122M is located around the second via 22 penetrating the second internal electrode 12M. Note that FIGS. 24A and 24B include plan views illustrating the configuration of the first internal electrode 11M and the second internal electrode 12M of a multi-terminal multilayer capacitor 1M according to a twelfth preferred embodiment.

A first slit 31M connects between the first insulating portion 111 and the first land pattern 112M (first via 21). Similarly, a second slit 32M connects between the second insulating portion 121 and the second land pattern 122M (second via 22). The other configurations are the same as or similar to those of the multi-terminal multilayer capacitor 1F according to the sixth preferred embodiment described above, and therefore detailed description thereof is omitted here.

According to the present preferred embodiment, by providing the first and second land patterns 112M and 122M, the conductive connection between the first and second internal electrodes 11M and 12M and the first and second vias 21 and 22 can be reliably achieved, and the influence of positional deviation or the like (variation) can be reduced.

Although the preferred embodiments of the present invention have been described above, the present invention is not limited to the above-described preferred embodiments and various modifications are possible. For example, the number and arrangement (array) of the first and second vias 21 and 22 and the first and second external terminals 41 and 42, and the shape and arrangement of the first and second slits 31 and 32 described above are merely examples, and can be arbitrarily set in accordance with requirements or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multi-terminal multilayer capacitor comprising:
   first internal electrodes and second internal electrodes alternately stacked with a dielectric layer interposed between the first internal electrode and the second internal electrode;
   a plurality of first vias located inside the first internal electrode and the second internal electrode in a plan view, electrically connected to the first internal electrode and insulated from the second internal electrode, and penetrating the first internal electrode and the second internal electrode in a stacking direction;
   a plurality of second vias located inside the first internal electrode and the second internal electrode in a plan view, electrically connected to the second internal electrode and insulated from the first internal electrode, and penetrating the first internal electrode and the second internal electrode in a stacking direction;
   a first slit extending between a first insulating portion and the first via, the first insulating portion being located around the second via that penetrates the first internal electrode and insulating the second via and the first internal electrode from each other;
   a second slit extending between a second insulating portion and the second via, the second insulating portion being located around the first via that penetrates the second internal electrode and insulating the first via and the second internal electrode from each other;
   a plurality of first external terminals connected to the plurality of first vias, respectively; and
   a plurality of second external terminals connected to the plurality of second vias, respectively; wherein
   the first internal electrode is split into a plurality of first regions by the first slit, and the first via electrically connects the plurality of first regions;

the second internal electrode is split into a plurality of second regions by the second slit, and the second via electrically connects the plurality of second regions;

the plurality of first external terminals is linearly aligned in a plan view;

the plurality of second external terminals is linearly aligned in a plan view;

the plurality of linearly aligned first external terminals and the plurality of linearly aligned second external terminals are alternately positioned in a staggered manner with a half-pitch shift;

the first slit extends in an oblique direction with respect to a contour of the first internal electrode; and the second slit extends in an oblique direction with respect to a contour of the second internal electrode.

2. The multi-terminal multilayer capacitor according to claim 1, wherein the first external terminals and the second external terminals are alternatingly positioned in a matrix in a plan view.

3. The multi-terminal multilayer capacitor according to claim 1, wherein the first slit and the second slit are positioned to define a lattice shape.

4. The multi-terminal multilayer capacitor according to claim 1, wherein the first slit and the second slit overlap each other in a plan view.

5. The multi-terminal multilayer capacitor according to claim 1, wherein the first slit has a tapered shape that narrows toward the first via; and the second slit has a tapered shape that narrows toward the second via.

6. The multi-terminal multilayer capacitor according to claim 1, wherein a first land pattern is located around the first via penetrating the first internal electrode;

a second land pattern is located around the second via penetrating the second internal electrode;

the first slit connects between the first insulating portion and the first land pattern; and the second slit connects between the second insulating portion and the second land pattern.

7. The multi-terminal multilayer capacitor according to claim 1, wherein the multilayer capacitor has a rectangular or substantially rectangular shape.

8. The multi-terminal multilayer capacitor according to claim 1, wherein a number of the plurality of first vias is different from a number of the plurality of second vias.

9. The multi-terminal multilayer capacitor according to claim 1, wherein a number of the plurality of first external terminals is different from a number of the plurality of second external terminals.

10. The multi-terminal multilayer capacitor according to claim 1, wherein outer edges of the first internal electrodes and the second internal electrodes are not divided by the first slit and the second slit.

11. The multi-terminal multilayer capacitor according to claim 1, wherein the first slit and the second slit are not located at outer edges of the first internal electrodes and the second internal electrodes.

12. The multi-terminal multilayer capacitor according to claim 1, wherein the plurality of first regions of the first slit and the plurality of second regions of the second slit are positioned to define three straight lines extending parallel or substantially parallel to first internal electrodes and the second internal electrodes.

13. The multi-terminal multilayer capacitor according to claim 1, wherein the first slit and the second slit are perpendicular or substantially perpendicular to each other in a plan view.

14. The multi-terminal multilayer capacitor according to claim 1, wherein the first slit extends in a direction oblique to the first internal electrodes and the second slit extends in a direction oblique to the second internal electrodes.

15. The multi-terminal multilayer capacitor according to claim 1, wherein the first slit and the second slit do not overlap with each other in a plan view.

* * * * *